(12) United States Patent
Stefansson et al.

(10) Patent No.: US 8,533,697 B2
(45) Date of Patent: Sep. 10, 2013

(54) GRAPHICAL PROCESSING UNIT (GPU) ARRAYS PROVIDING HIGH COMPUTATIONAL CAPABILITIES IN A COMPUTING ENVIRONMENT

(75) Inventors: Halldor N. Stefansson, Natick, MA (US); Edric Ellis, Cambs (GB); Jocelyn Luke Martin, Burwell (GB)

(73) Assignee: The MathWorks, Inc., Natick, MA (US)

( * ) Notice: Subject to any disclaimer, the term of this patent is extended or adjusted under 35 U.S.C. 154(b) by 422 days.

(21) Appl. No.: 12/894,544

(22) Filed: Sep. 30, 2010

(65) Prior Publication Data

US 2011/0035736 A1    Feb. 10, 2011

Related U.S. Application Data

(63) Continuation-in-part of application No. 12/254,618, filed on Oct. 20, 2008, now Pat. No. 8,250,550, and a continuation-in-part of application No. 12/254,572, filed on Oct. 20, 2008, now Pat. No. 8,239,844, said application No. 12/254,618 is a continuation-in-part of application No. 11/748,938, filed on May 15, 2007, now Pat. No. 8,010,954, and a continuation-in-part of application No. 11/748,947, filed on May 15, 2007, now Pat. No. 8,108,845, said application No. 12/254,572 is a continuation-in-part of application No. 11/748,938, and a continuation-in-part of application No. 11/748,947, which is a continuation-in-part of application No. 11/706,805, filed on Feb. 14, 2007, now Pat. No. 7,975,001, said application No. 11/748,938 is a continuation-in-part of application No. 11/706,805.

(60) Provisional application No. 61/322,131, filed on Apr. 8, 2010.

(51) Int. Cl.
G06F 9/45 (2006.01)
G06F 9/44 (2006.01)

(52) U.S. Cl.
USPC ............................ 717/149; 717/148; 717/151

(58) Field of Classification Search
USPC .......................................... 717/145–151, 106
See application file for complete search history.

(56) References Cited

U.S. PATENT DOCUMENTS 5,832,272 A * 11/1998 Kalantery ...................... 717/149
5,946,487 A *  8/1999 Dangelo ....................... 717/148

(Continued)

OTHER PUBLICATIONS

Ding et al, "Using graphics processors for high performance IR query processing", ACM WWW, pp. 421-430, 2009.*

(Continued)

*Primary Examiner* — Anil Khatri
(74) *Attorney, Agent, or Firm* — Harrity & Harrity, LLP

(57) ABSTRACT

A device initiates a technical computing environment (TCE), and receives, via the TCE, a program command that permits the TCE to access a graphical processing unit that is remote to the device, where the program command permits the TCE to seamlessly transfer data to the remote GPU. The device transforms, via the TCE, the program command into a program command that is executable by the remote GPU, and provides the transformed program command to the remote GPU for execution. The device also receives, from the remote GPU, one or more results associated with execution of the transformed program command by the remote GPU, and utilizes the one or more results via the TCE.

20 Claims, 22 Drawing Sheets

(56) References Cited

U.S. PATENT DOCUMENTS

| | | | |
|---|---|---|---|
| 6,463,580 B1 * | 10/2002 | Wilkerson | 717/149 |
| 6,879,266 B1 * | 4/2005 | Dye et al. | 341/51 |
| 7,111,132 B2 * | 9/2006 | Wilkerson | 711/154 |
| 7,234,144 B2 * | 6/2007 | Wilt et al. | 718/104 |
| 7,631,309 B2 * | 12/2009 | Wilt et al. | 718/104 |
| 7,634,778 B2 * | 12/2009 | Mosier et al. | 719/318 |
| 7,730,463 B2 * | 6/2010 | Eichenberger et al. | 717/136 |
| 7,975,001 B1 | 7/2011 | Stefansson et al. | |
| 8,010,954 B2 * | 8/2011 | Little et al. | 717/149 |
| 8,015,543 B1 * | 9/2011 | Carrick et al. | 717/106 |
| 8,104,030 B2 * | 1/2012 | Silvera et al. | 717/160 |
| 8,108,845 B2 * | 1/2012 | Little et al. | 717/149 |
| 8,136,109 B1 * | 3/2012 | Birdeau et al. | 717/175 |
| 8,225,325 B2 * | 7/2012 | Munshi et al. | 718/104 |
| 8,239,845 B2 * | 8/2012 | Stefansson et al. | 717/149 |
| 8,250,550 B2 * | 8/2012 | Luszczek et al. | 717/149 |
| 8,255,890 B2 * | 8/2012 | Luszczek et al. | 717/149 |
| 8,321,849 B2 * | 11/2012 | Nickolls et al. | 717/146 |
| 2009/0044179 A1 | 2/2009 | Luszczek et al. | |
| 2009/0044180 A1 | 2/2009 | Luszczek et al. | |
| 2009/0044196 A1 | 2/2009 | Stefansson et al. | |
| 2009/0044197 A1 | 2/2009 | Stefansson et al. | |
| 2009/0049435 A1 | 2/2009 | Luszczek et al. | |
| 2009/0119677 A1 | 5/2009 | Stefansson et al. | |
| 2009/0132867 A1 | 5/2009 | Stefansson et al. | |
| 2012/0011347 A1 | 1/2012 | Little et al. | |

OTHER PUBLICATIONS

Playne et al, "Asynchronous communication schemes for finite difference methods on multiple GPUs", IEEE, pp. 763-768, 2010.*

Francois, "A hybrid architectural style for distributed parallel processiing of generic data stream", IEEE, pp. 1-10, 2004.*

Cameron et al, "Architectural support for SWAR text processing with parallel bit stream:The inductive doubling principle", ACM ASPLOS, pp. 337-348, 2009.*

U.S. Appl. No. 12/181,815 entitled "Client Program Executable on Multiple Heterogeneous Server Platforms", by Webb et al., 70 pages.

Wikipedia, "Jacket (software)", http://en.wikipedia.org/wiki/Jacket_(software), Jun. 27, 2010, 3 pages.

NVIDIA Corporation, "White Paper—Accelerating MATLAB with CUDA™ Using MEX Files", Sep. 2007, 15 pages.

Gp-you.org, "GPUmat User Guide", Version 0.25, Apr. 2010, 246 pages.

Co-pending U.S. Appl. No. 12/894,547, filed Sep. 30, 2010, entitled "Saving and Loading Graphical Processing Unit (GPU) Arrays", by Halldor N. Stefansson et al., 87 pages.

* cited by examiner

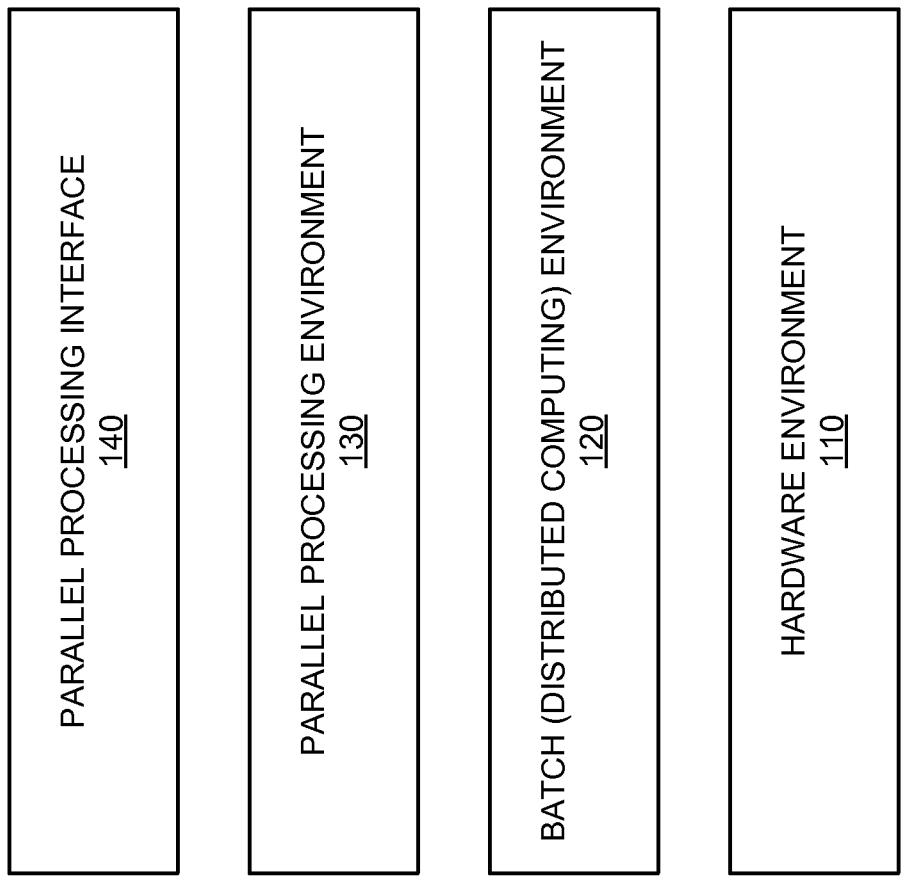

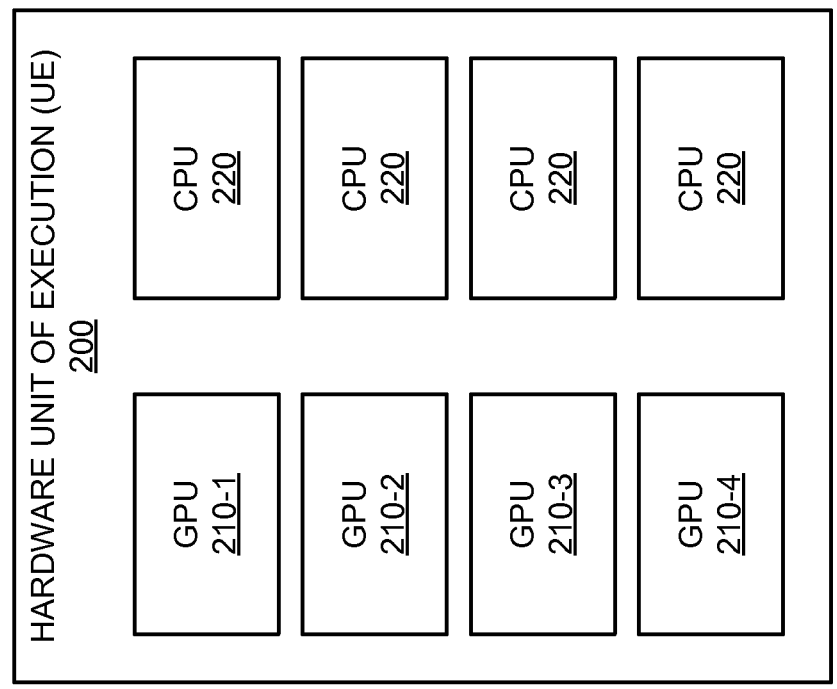

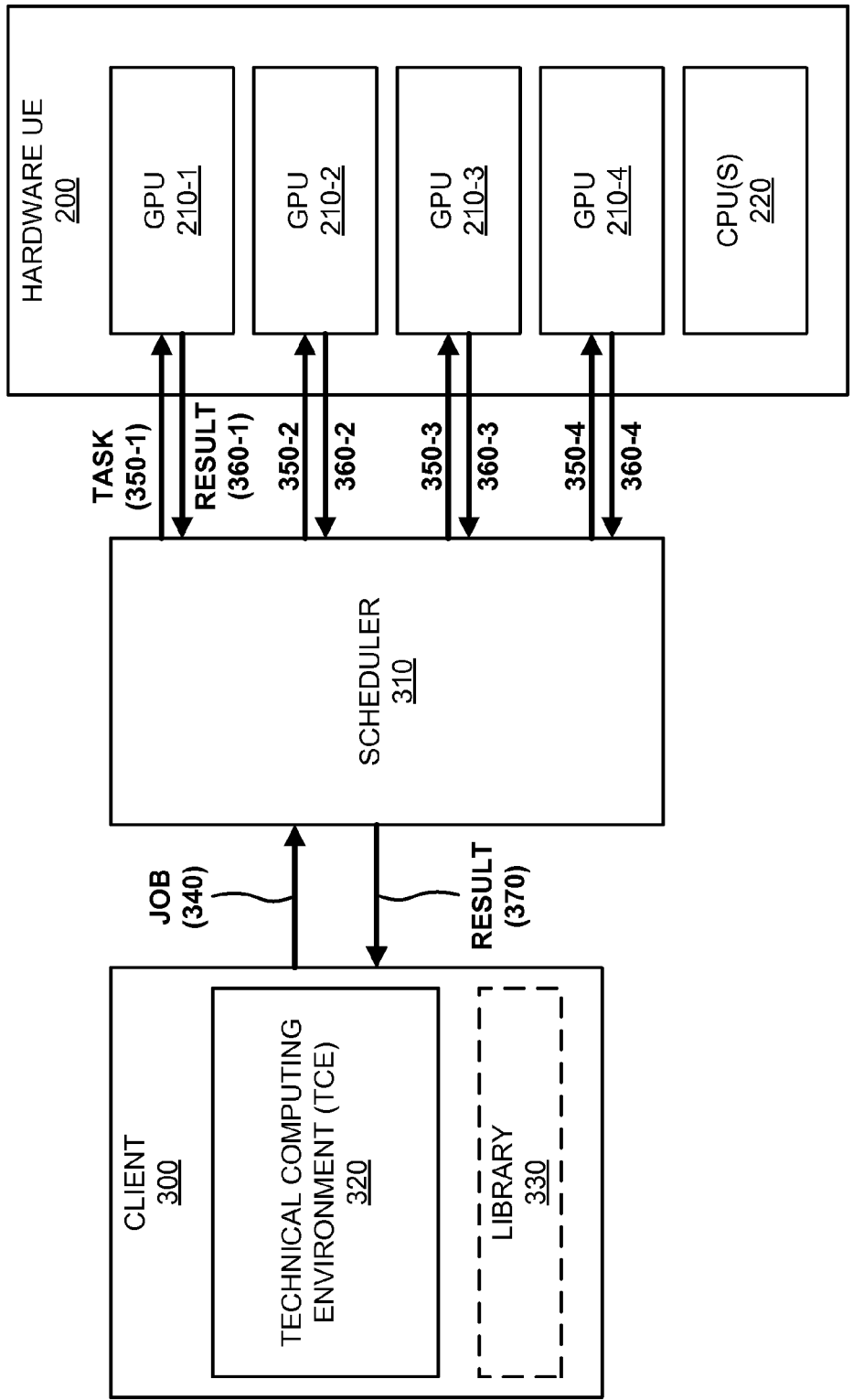

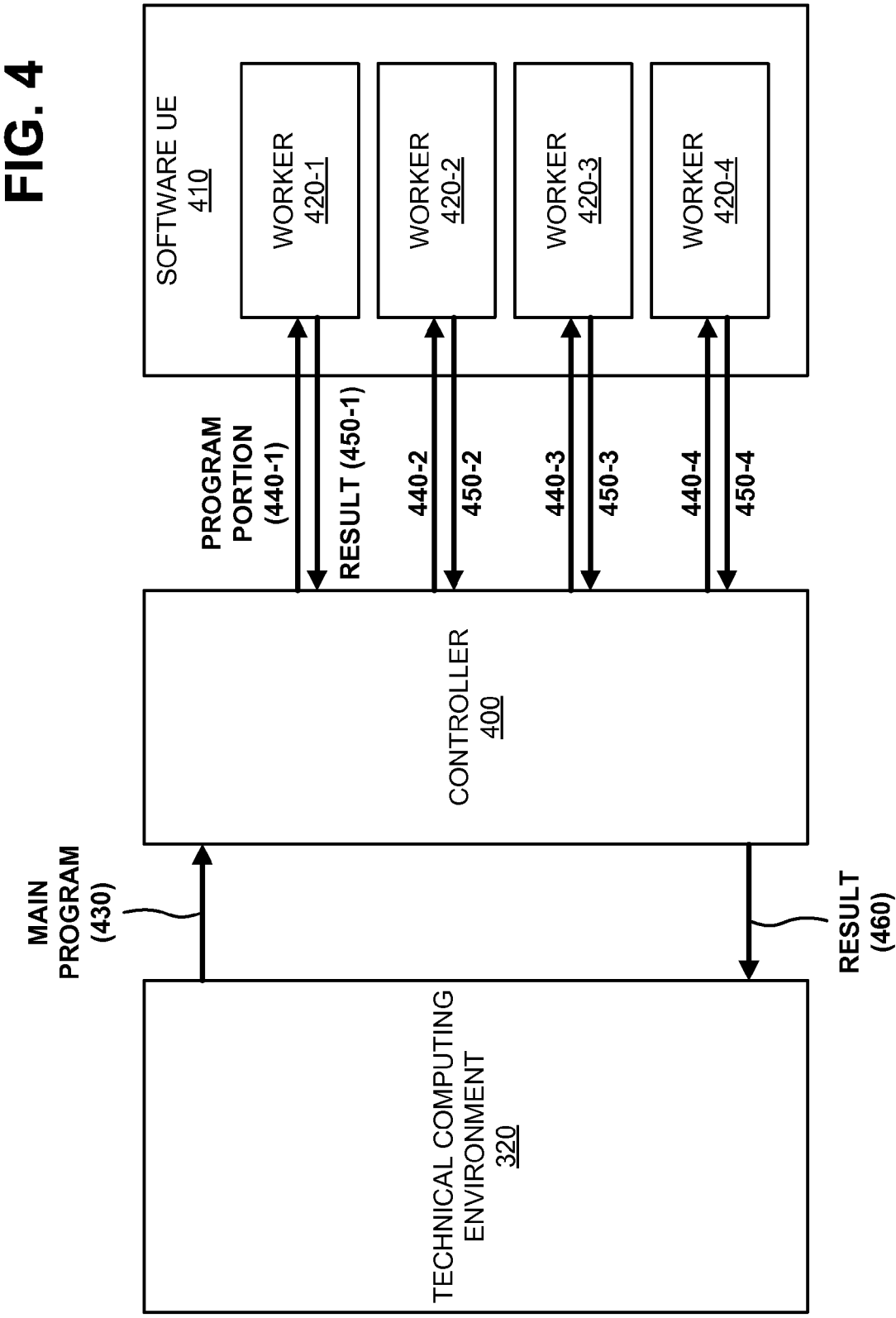

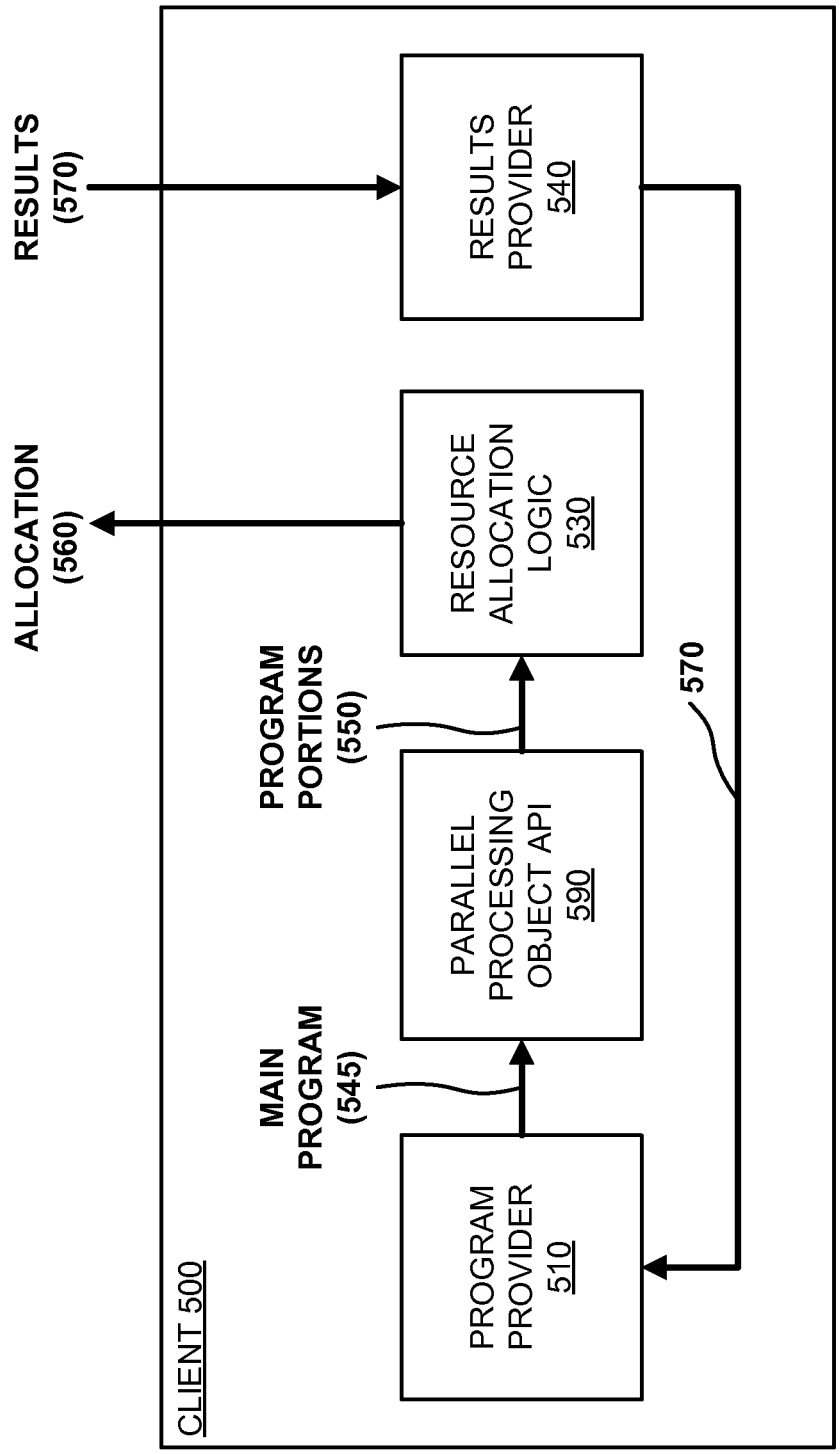

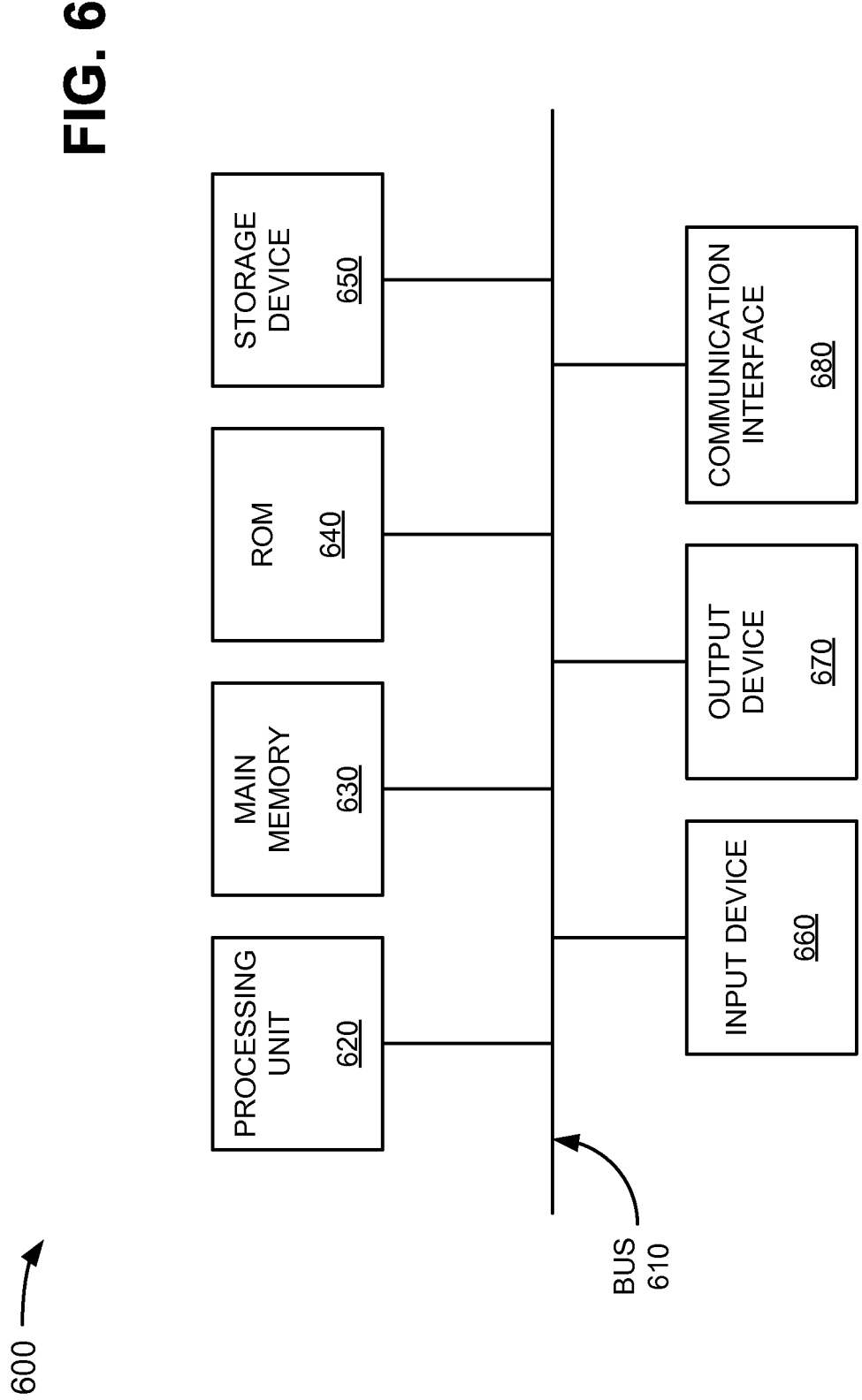

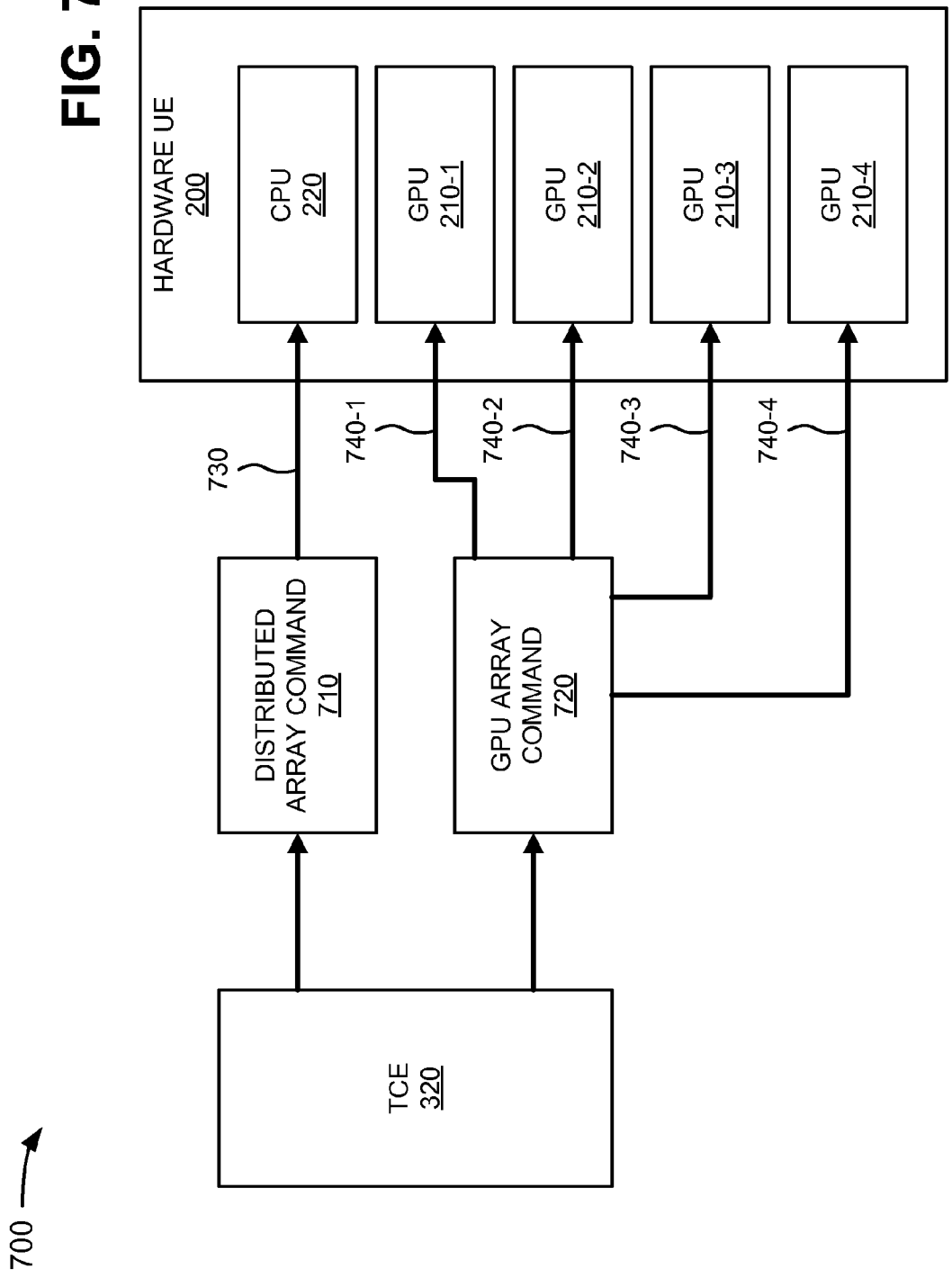

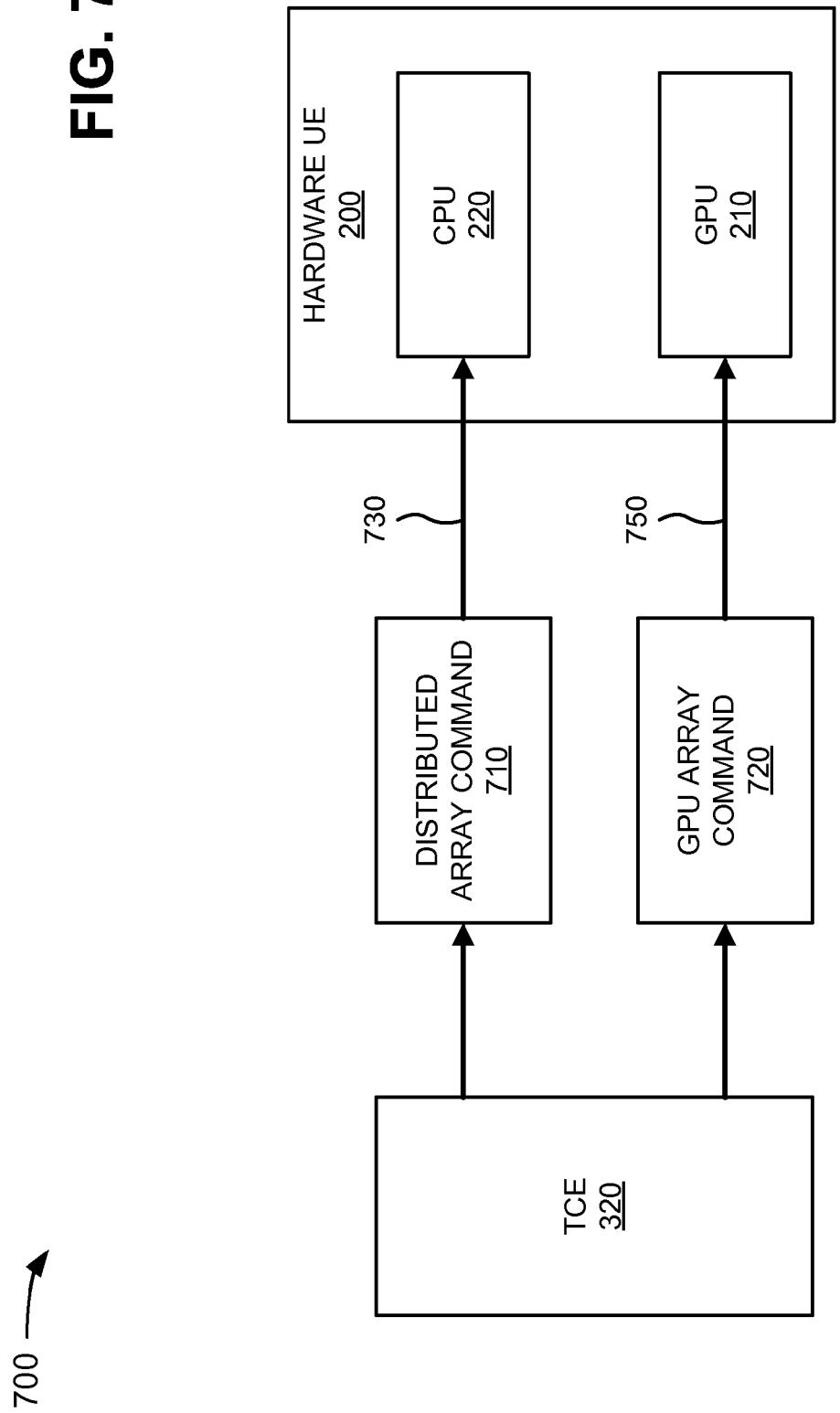

FIG. 13

| Feature | GPUArray | distributed |
|---|---|---|
| Construction | G = gpuArray(X) | D = distributed(X) |
| Build | gpuArray(ones(M,N,class))<br>parallel.gpu.GPUArray.ones(M,N,class) | distributed.ones(M,N,class) |
| Retrieve data | X = gather(G) | X = gather(D) |
| Class? | Class(G) ==<br>'parallel.gpu.GPUArray' | Class(D) == 'distributed' |
| How big is it? | s = size(G) | s = size(D) |
| What type does it hold? | c = classUnderlying(G)<br>tf = isaUnderlying(G, 'class') | c = classUnderlying(D)<br>tf = isaUnderlying(D, 'class') |
| Is it real? | isR = isreal(G) | isR = isreal(D) |
| Overloads in general | G = G1 + G2 * cos(G3) | D = D1 + D2 * cos(D3) |
| Unary Overloads | Gsin = sin(G)<br>Gfft = fft(G) | Dsin = sin(D)<br>Dfft = fft(D) |
| Binary Overloads | G = G1 + G2 | D = D1 + D2 |

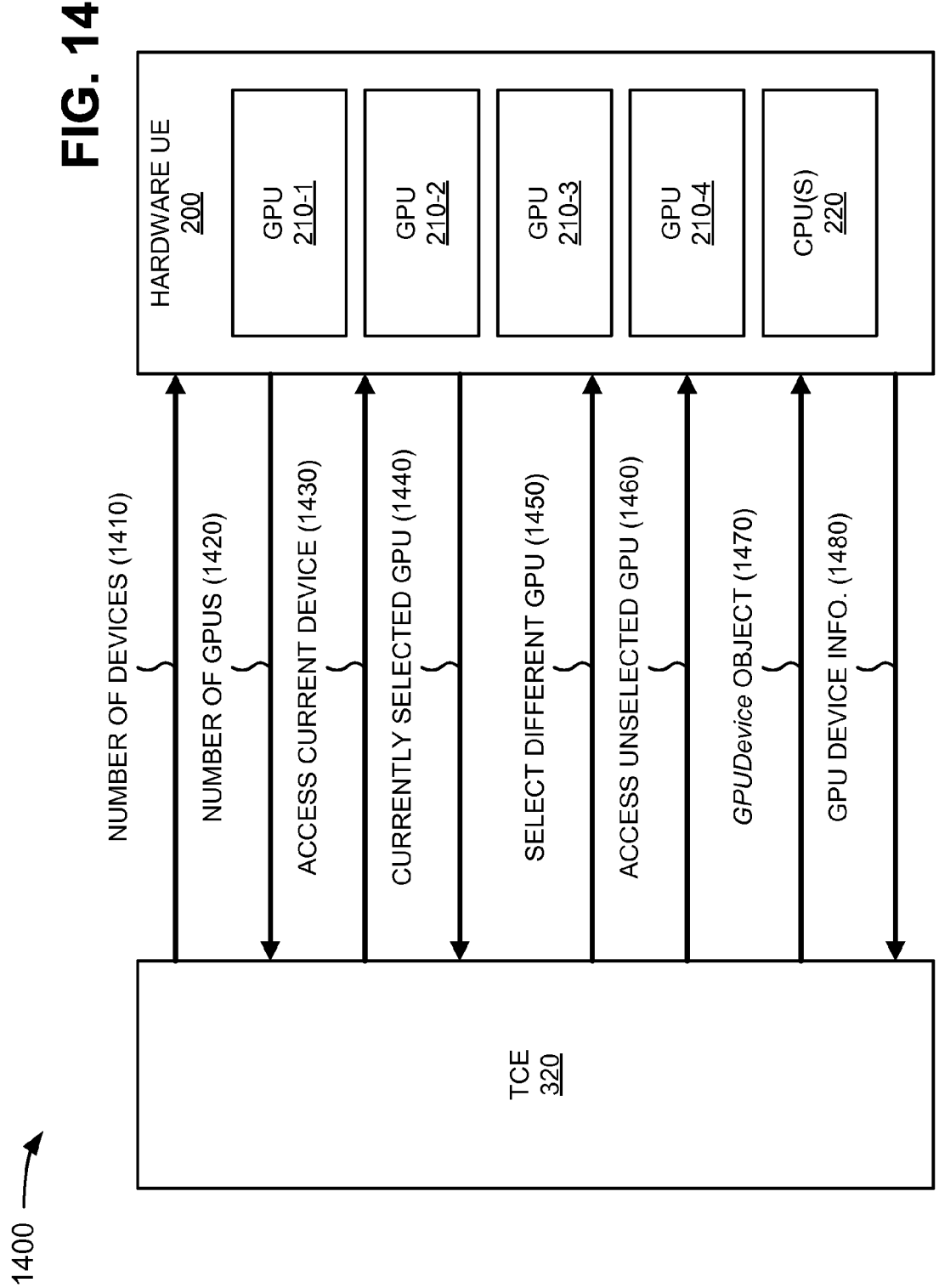

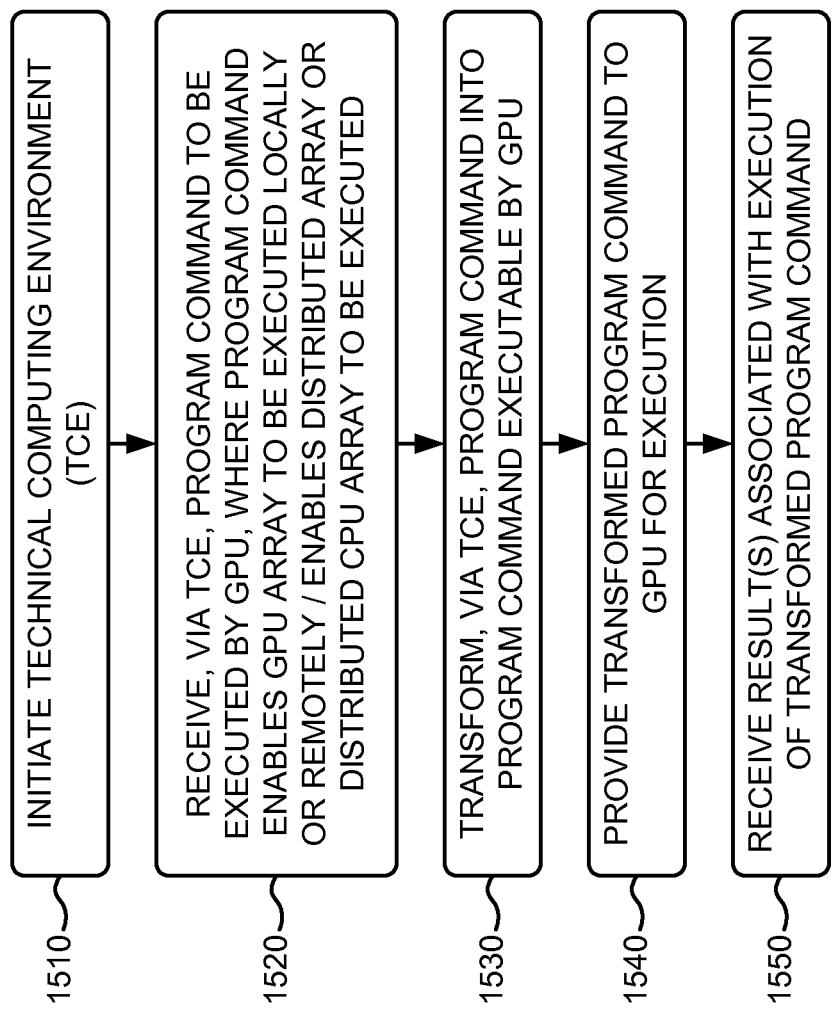

GRAPHICAL PROCESSING UNIT (GPU) ARRAYS PROVIDING HIGH COMPUTATIONAL CAPABILITIES IN A COMPUTING ENVIRONMENT

RELATED APPLICATIONS

This application is a continuation-in-part of U.S. patent application Ser. No. 12/254,618, filed Oct. 20, 2008 and is a continuation-in-part of U.S. patent application Ser. No. 12/254,572, filed Oct. 20, 2008. U.S. patent application Ser. Nos. 12/254,618 and 12/254,572 are continuations-in-part of U.S. patent application Ser. No. 11/748,938, filed May 15, 2007, which is a continuation-in-part of U.S. patent application Ser. No. 11/706,805, filed Feb. 14, 2007. U.S. patent application Ser. Nos. 12/254,618 and 12/254,572 are also continuations-in-part of U.S. patent application Ser. No. 11/748,947, filed May 15, 2007, which is a continuation-in-part of U.S. patent application Ser. No. 11/706,805, filed Feb. 14, 2007. This application further claims priority under 35 U.S.C. §119 based on U.S. Provisional Patent Application No. 61/322,131, filed Apr. 8, 2010. The entire contents of U.S. patent application Ser. Nos. 12/254,618, 12/254,572, 11/748,938, 11/748,947, 11/706,805 and U.S. Provisional Patent Application No. 61/322,131 are hereby incorporated by reference.

This application is also related to U.S. patent application Ser. No. 12/894,479, entitled "IDENTIFICATION AND TRANSLATION OF PROGRAM CODE EXECUTABLE BY A GRAPHICAL PROCESSING UNIT (GPU)," filed on the same date herewith, the disclosure of which is incorporated by reference herein in its entirety. This application is further related to U.S. patent application Ser. No. 12/894,547, entitled "SAVING AND LOADING GRAPHICAL PROCESSING UNIT (GPU) ARRAYS," filed on the same date herewith, the disclosure of which is incorporated by reference herein in its entirety.

BACKGROUND

Graphical processing units (GPUs) provide high computation capabilities at lower prices than comparable central processing units (CPUs). For example, one particular GPU can compute one trillion floating point operations in a single second (i.e., one teraflop). GPUs may be provided in a variety of devices (e.g., desktop computers) and/or systems (e.g., a high performance computing center) to provide improved numerical performance.

A GPU may include a number of characteristics. For example, a GPU may include many vector processing elements (e.g., cores) operating in parallel, where each vector core addresses a separate on-device memory. There is high memory bandwidth between the on-device memories and the vector cores, and memory latency is relatively large (e.g., four-hundred clock cycles). A GPU may provide zero overhead thread scheduling (e.g., which enables algorithms with high thread counts); however, the GPU may include limited support for communications between threads. A relatively low memory bandwidth is provided between the GPU's device memory and host memory. A GPU also provides limited support for general-purpose programming constructs (e.g., code executing on the GPU cannot allocate memory itself, this must be accomplished by a host CPU).

These characteristics mean that programming for the GPU is not straightforward and highly parallel algorithms need to be created for the GPU. A typical high-level program will be hosted on a CPU that invokes computational kernels on the GPU in a sequence to achieve a result. Because of the relatively low bandwidth available to transfer data to and from the GPU's own memory, efficient programs may transfer data only when necessary.

Various technologies exist for programming GPUs. The compute unified device architecture (CUDA) is an example of a technology for programming GPUs. CUDA is a parallel computing architecture, developed by NVIDIA, which includes pre-written libraries providing fast Fourier transform (FFT) and other functionalities. CUDA provides a C-like language in which to write computational kernels for execution on NVIDIA GPUs. Other technologies for programming GPUs are being developed, such as the Open Computing Language (OpenCL) framework, Microsoft's DirectX, and NVIDIA's Parallel Nsight.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 1 is a diagram of an example architectural overview in which implementations described herein may be practiced;

FIG. 2 is a diagram of example components of a hardware environment of FIG. 1;

FIG. 3 is a diagram of example components of a batch (or distributed computing) environment illustrated in FIG. 1;

FIG. 4 is a diagram of example components of a parallel processing environment of FIG. 1;

FIG. 5C is a diagram of example functional components of the parallel processing interface in another alternative arrangement;

FIG. 6 is a diagram of example hardware components of a client and/or a web service depicted in FIGS. 5A and 5B;

FIGS. 7A and 7B are diagrams of example parallel processing constructs capable of being executed by a central processing unit (CPU) and/or a GPU(s) of the hardware environment depicted in FIG. 2;

FIG. 13 is a table of example features of a GPU array construct as compared to features of a distributed array construct;

FIG. 14 is a diagram of example information that may be exchanged between a technical computing environment and multiple GPUs; and FIGS. 15-19 are flow charts of an example process for transforming a GPU array construct into a GPU-executable form according to implementations described herein.

DETAILED DESCRIPTION

Figure 5A:
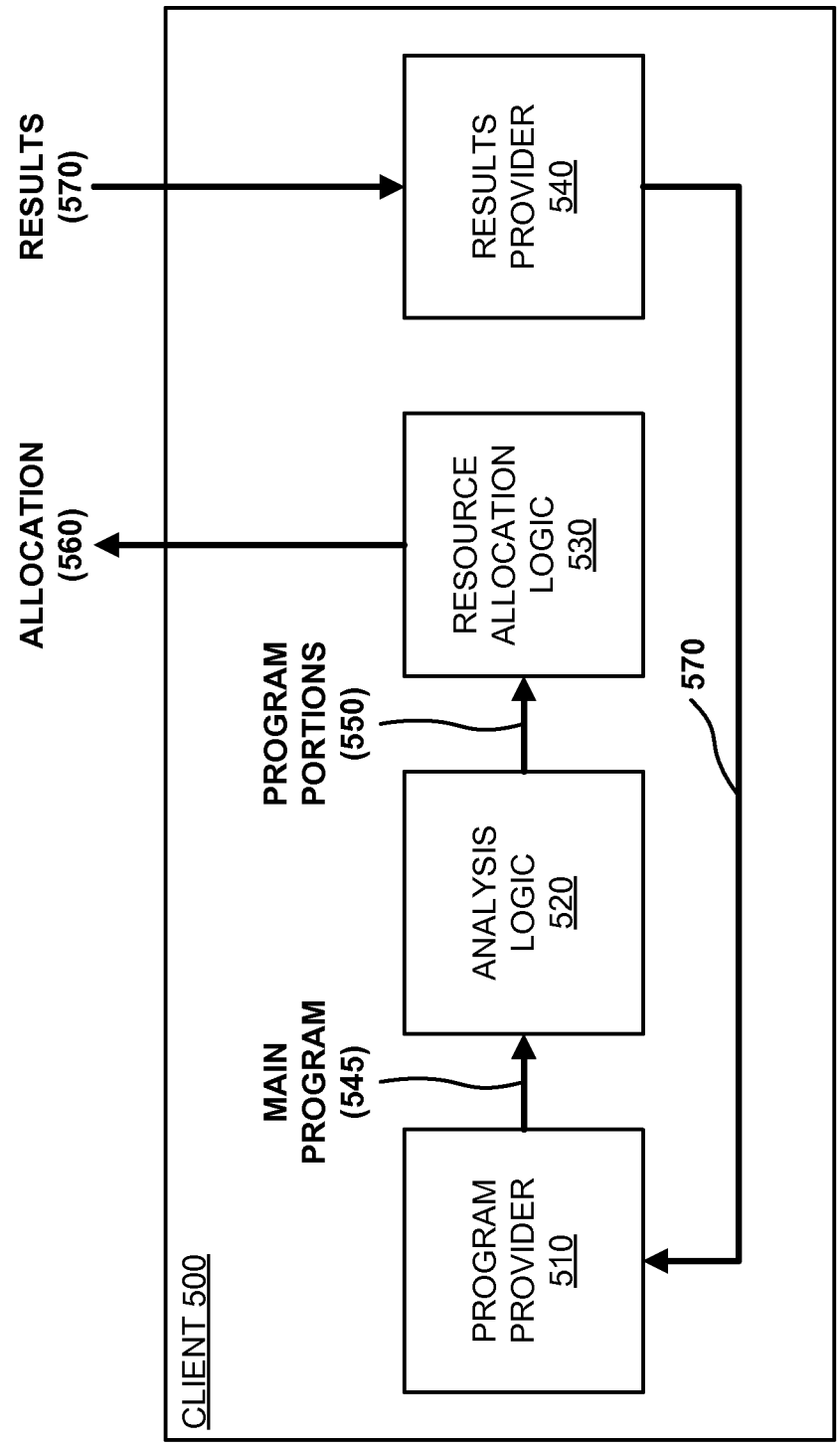
FIG. 5A is a diagram of example functional components of a parallel processing interface illustrated in FIG. 1.

The following detailed description refers to the accompanying drawings. The same reference numbers in different drawings may identify the same or similar elements. Also, the following detailed description does not limit the invention.

Overview

Systems and/or methods described herein may transform a GPU array construct into a form that is executable on a GPU. The GPU may be local to a client device executing a TCE, or may be remote to the client device. The client device and the TCE may interact with a cluster of remote GPUs, or may interact with GPUs provided in a cloud.

For example, in one implementation, the systems and/or methods may initiate a technical computing environment, and may receive, via the technical computing environment, a program command that permits the technical computing environment to access a remote graphical processing unit (GPU), where the program command permits the technical computing environment to seamlessly transfer data to the remote graphical processing unit. The systems and/or methods may transform, via the technical computing environment, the program command into a program command that is executable by the remote graphical processing unit, and may provide the transformed program command to the remote graphical processing unit for execution. The systems and/or methods may receive, from the remote graphical processing unit, one or more results associated with execution of the transformed program command by the remote graphical processing unit, and may utilize the one or more results via the technical computing environment.

The term a "worker," as used herein, is to be broadly interpreted to include software or a combination of hardware and software that performs and/or participates in parallel processing activities. For example, a worker may perform and/or participate in parallel processing activities in response to a request and/or a task received from a client. In one example, a worker may be implemented as a software unit of execution and/or a hardware unit of execution. A worker may perform and/or participate in substantially any type of parallel processing (e.g., task, data, and/or stream processing). In one example, a worker may perform and/or participate in parallel processing activities in response to a receipt of a program or one or more portions of the program. A worker may support one or more threads (or processes) when performing processing operations.

The term "parallel processing," are used herein, is to be broadly interpreted to include any type of processing that can be distributed across two or more resources (e.g., software units of execution, hardware units of execution, processors, microprocessors, clusters, workers, etc.) and be performed at substantially the same time. For example, in one implementation, parallel processing may refer to task parallel processing where a number of tasks are processed at substantially the same time on a number of software units of execution. In task parallel processing, each task may be processed independently of other tasks executing at the same time (e.g., a first software unit of execution executing a first task may not communicate with a second software unit of execution executing a second task). In another implementation, parallel processing may refer to data parallel processing, where data (e.g., a data set) is parsed into a number of portions that are executed in parallel using two or more software units of execution. In data parallel processing, the software units of execution and/or the data portions may communicate with each other as processing progresses.

In still another implementation, parallel processing may refer to stream parallel processing (also referred to as pipeline parallel processing). Stream parallel processing may use a number of software units of execution arranged in series (e.g., a line) where a first software unit of execution produces a first result that is fed to a second software unit of execution that produces a second result. Stream parallel processing may also include a state where task allocation may be expressed in a directed acyclic graph (DAG) or a cyclic graph with delays. Other implementations may combine two or more of task, data, or stream parallel processing techniques alone or with other types of processing techniques to form hybrid-parallel processing techniques.

The term "parallel processing environment," as used herein, is to be broadly interpreted to include any environment capable of performing parallel processing. For example, a parallel processing environment may include a dynamic number of processes provided on one or more hardware, software, and/or a combination of hardware and software units of execution which may have several different control and data passing layers through which a current behavior of a part or a whole of the environment may be specified. In one implementation, a front-end application (e.g., a parallel processing interface) may interface with the parallel processing environment to provide one or more users with access to the parallel processing environment. In another implementation, the processes involved in the parallel processing environment may include processes associated with a technical computing environment.

The term a "technical computing environment (TCE)," as used herein, is to be broadly interpreted to include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, a TCE may include a dynamically-typed programming language (e.g., the M language or MATLAB® language) that can be used to express problems and/or solutions in mathematical notations. For example, a TCE may use an array as a basic element, where the array may not require dimensioning. In addition, a TCE may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

A TCE may further provide mathematical functions and/or graphical tools (e.g., for creating plots, surfaces, images, volumetric representations, etc.). In one implementation, a TCE may provide these functions and/or tools using toolboxes (e.g., toolboxes for signal processing, image processing, data plotting, parallel processing, etc.). In another implementation, a TCE may provide these functions as block sets. In still another implementation, a TCE may provide these functions in another way, such as via a library, etc.

A TCE may be implemented as a text-based environment (e.g., MATLAB® software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.), a graphically-based environment (e.g., Simulink® software, Stateflow® software, SimEvents™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; aspects of a Unified Modeling Language (UML) or SysML environment; etc.), or another type of environment, such as a hybrid environment that includes one or more of the above-referenced text-based environments and one or more of the above-referenced graphically-based environments.

Example Architectural Overview

FIG. 1 is a diagram of an example architectural overview 100 in which implementations described herein may be practiced. As illustrated, overview 100 may include a hardware environment 110, a batch (or distributed computing) environment 120, a parallel processing environment 130, and/or a parallel processing interface 140.

Hardware environment 110 may include one or more hardware resources that may be used to perform parallel processing. For example, in one implementation, hardware environment 110 may include one or more hardware units of execution. Further details of hardware environment 110 are provided below in connection with FIG. 2.

Batch environment 120 may provide a distributed computing environment for a job. For example, in one implementation, batch (or distributed computing) environment 120 may include a client that provides a job to a scheduler. The scheduler may distribute the job into one or more tasks, and may provide the tasks to one or more hardware units of execution and/or one or more processors. The hardware units of execution and/or processors may execute the tasks, and may provide results to the scheduler. The scheduler may combine the results into a single result, and may provide the single result to the client. Further details of batch environment 120 are provided below in connection with FIG. 3.

Parallel processing environment 130 may provide parallel processing for a main program. For example, in one implementation, parallel processing environment 130 may include a technical computing environment that provides a main program to a controller. The controller may provide portions of the program to one or more software units of execution and/or one more workers. The software units of execution and/or workers may execute the program portions, and may provide results to the controller. The controller may combine the results into a single result, and may provide the single result to the technical computing environment. Further details of parallel processing environment 130 are provided below in connection with FIG. 4.

Parallel processing interface 140 may include a front-end application (e.g., an application program interface (API)) that provides an interface for dynamically accessing, controlling, utilizing, etc. hardware environment 110, batch environment 120, and/or parallel processing environment 130. For example, in one implementation, parallel processing interface 140 may include parallel processing constructs that permit users to express specific parallel workflows. In such an implementation, parallel processing interface 140 may include a program provider that provides a main program to analysis logic. The analysis logic may analyze the main program, may parse the main program into program portions, and may provide the program portions to resource allocation logic. The resource allocation logic may allocate the program portions to one or more software units of execution and/or hardware units of execution. The program portions may be executed, and results may be provided to the program provider. In another implementation, parallel processing interface 140 may include an object API where a user may specify how a program may be parallelized. Further details of parallel processing interface 140 are provided below in connection with FIGS. 5A-5C.

Although FIG. 1 shows example components of architectural overview 100, in other implementations, architectural overview 100 may include fewer components, different components, differently arranged components, or additional components than depicted in FIG. 1.

Example Hardware Environment

FIG. 2 is a diagram of example components of hardware environment 110. As illustrated, hardware environment 110 may include a hardware unit of execution (UE) 200 with one or more graphical processing units (GPUs) 210-1, 210-2, 210-3, 210-4 (collectively, "GPUs 210") and one or more central processing units (CPUs) 220.

A hardware unit of execution may include a device (e.g., a hardware resource) that performs and/or participates in parallel processing activities. For example, a hardware unit of execution may perform and/or participate in parallel processing activities in response to a request and/or a task received from a client. A hardware unit of execution may perform and/or participate in substantially any type of parallel processing (e.g., task, data, and/or stream processing) using one or more devices. For example, in one implementation, a hardware unit of execution may include a single processor that includes multiple cores and in another implementation, the hardware unit of execution may include a number of processors. Devices used in a hardware unit of execution may be arranged in substantially any configuration (or topology), such as a grid, ring, star, etc. A hardware unit of execution may support one or more threads (or processes) when performing processing operations.

In one implementation, hardware UE 200 may perform parallel processing activities on behalf of another device. In another implementation, hardware UE 200 may perform parallel processing activities on behalf of itself or on behalf of a host of which hardware UE 200 is a part. Hardware UE 200 may perform parallel processing in a variety of ways. For example, hardware UE 200 may perform parallel processing activities related to task parallel processing, data parallel processing, stream parallel processing, etc. Hardware UE 200 may perform parallel processing using processing devices resident on UE 200 and/or using processing devices that are remote with respect to UE 200.

As further shown in FIG. 2, hardware UE 200 may include GPUs 210-1, 210-2, 210-3, and 210-4. GPUs 210 may include hardware or a combination of hardware and software that performs processing operations. Each of GPUs 210 may include one or more specialized microprocessors that offload and accelerate three-dimensional or two-dimensional processing, such as graphics rendering, from a microprocessor. Each of GPUs 210 may include a highly parallel structure that makes GPU 210 more effective than general-purpose CPUs for a range of complex algorithms. In one implementation, each GPU 210 may represent a single hardware UE.

Each CPU 220 may include one or more processors, microprocessors, a field programmable gate array (FPGA), an application specific integrated circuit (ASIC), or other types of processing units that may interpret and execute instructions. Each CPU 220 may include one or more cores and may communicate with one or more GPUs 210.

Although FIG. 2 shows example components of hardware environment 110, in other implementations, hardware environment 110 may include fewer components, different components, differently arranged components, or additional components than depicted in FIG. 2. For example, in one implementation, hardware environment 110 may include one or more of a bus, a main memory, a read-only memory (ROM), a storage device, an input device, an output device, and/or a communication interface. In still other implementations, one or more components of hardware environment 110 may perform one or more other tasks described as being performed by one or more other components of hardware environment 110.

Example Batch Environment

FIG. 3 is a diagram of example components of batch environment 120. As illustrated, batch environment 120 may include a client 300, a scheduler 310, and hardware UE 200 (including processors 210). Hardware UE 200 and processors 210 may include the features described above in connection with FIG. 2.

Client 300 may include one or more devices, such as a personal computer, a personal digital assistant (PDA), a laptop, or another type of computation or communication device. In an example implementation, client 300 may include a device capable of sending information to, or receiving information from, another device, such as hardware UE 200. As shown in FIG. 3, client 300 may include a technical computing environment (TCE) 320 and a library 330. Other implementations of client 300 may include fewer, different, or additional components than depicted in FIG. 3.

Technical computing environment (TCE) 320 may include any of the features described above with respect to the term "technical computing environment."

Library 330 may include hardware or a combination of hardware and software that may operate with TCE 320 to perform certain operations. For example, in one implementation, library 330 may store functions to perform certain operations (e.g., signal processing, image processing, parallel processing, data display, etc.) in a text-based environment. In another implementation, library 330 may store graphical representations (e.g., blocks, icons, images, etc.) to perform certain operations in a graphically-based environment (e.g., a gain block, a source block, a filter block, a discrete event generator block, etc.).

Scheduler 310 may include hardware or a combination of hardware and software to perform scheduling operations on behalf of a device (e.g., client 300). For example, scheduler 310 may perform operations to select and/or control parallel processing activities performed by hardware UE 200 on behalf of client 300. In one implementation, scheduler 310 may receive a job 340, and may distribute or divide job 340 into tasks (e.g., tasks 350-1, 350-2, 350-3, and 350-4). Scheduler 310 may indirectly send tasks 350-1, 350-2, 350-3, and 350-4 to hardware UE 200 (e.g., to GPUs 210-1, 210-2, 210-3, and 210-4, respectively) for execution. Scheduler 310 may indirectly receive results from hardware UE 200 (e.g., results 360-1, 360-2, 360-3, and 360-4), may assemble the results into a single result 370, and may provide result 370 to client 300. Scheduler 310 may reside locally on client 300 or may be located remotely with respect to client 300 depending on particular implementations described herein. In one example, scheduler 310 may schedule processes, and the processes may communicate with GPUs 210 (i.e., scheduler 310 may not directly communicate with GPUs 210).

Although FIG. 3 shows example components of batch environment 120, in other implementations, batch environment 120 may include fewer components, different components, differently arranged components, or additional components than depicted in FIG. 3. In still other implementations, one or more components of batch environment 120 may perform one or more other tasks described as being performed by one or more other components of batch environment 120.

Example Parallel Processing Environment

FIG. 4 is a diagram of example components of parallel processing environment 130. As illustrated, parallel processing environment 130 may include technical computing environment 320, a controller 400, and a software unit of execution (UE) 410. Technical computing environment 320 may include any of the features described above with respect to the term "technical computing environment."

Controller 400 may include hardware or a combination of hardware and software to perform controlling operations on behalf of a program. For example, in one implementation, controller 400 may select and/or control parallel processing activities performed by software UE 410 on behalf of technical computing environment 320.

A software unit of execution may include a software resource (e.g., a worker, a lab, etc.) that performs and/or participates in parallel processing activities. For example, a software unit of execution may perform and/or participate in parallel processing activities in response to receipt of a program and/or one or more portions of the program. A software unit of execution may perform and/or participate in substantially any type of parallel processing using one or more hardware units of execution. A software unit of execution may support one or more threads (or processes) when performing processing operations.

In one implementation, software UE 410 may include one or more workers (e.g., workers 420-1, 420-2, 420-3, and 420-3, collectively referred to as "workers 420"). Workers 420 may include any of the features described above with respect to the term "worker." In one implementation, a worker may be similar to a software unit of execution, except on a smaller scale. In other implementations, a worker may represent a single software unit of execution. In one example, multiple workers 420 may access and communicate with the same GPU 210.

In an example operation, technical computing environment 320 may provide a main program 430 to controller 400. Controller 400 may provide portions of program 430 (e.g., program portions 440-1, 440-2, 440-3, and 440-4, collectively referred to as "program portions 440") to workers 420-1, 420-2, 420-3, and 420-4, respectively, to software UE 410. Workers 420 may execute program portions 440, and may provide results to controller 400. For example, worker 420-1 may provide a result 450-1 to controller 400, worker 420-2 may provide a result 450-2 to controller 400, worker 420-3 may provide a result 450-3 to controller 400, and worker 420-4 may provide a result 450-4 to controller 400. Controller 400 may combine the results into a single result 460, and may provide single result 460 to technical computing environment 320.

Although FIG. 4 shows example components of parallel processing environment 130, in other implementations, parallel processing environment 130 may include fewer components, different components, differently arranged components, or additional components than depicted in FIG. 4. In still other implementations, one or more components of parallel processing environment 130 may perform one or more other tasks described as being performed by one or more other components of parallel processing environment 130.

Example Parallel Processing Interfaces

FIG. 5A is diagram of example functional components of parallel processing interface 140. As illustrated, parallel processing interface 140 may include a client 500 that includes a variety of functional components, such as a program provider 510, analysis logic 520, resource allocation logic 530, and/or a results provider 540.

Client 500 may include one or more devices, such as a personal computer, a PDA, a laptop, or another type of computation or communication device. In an example implementation, client 500 may include a device capable of providing a parallel processing interface, as described herein. Other implementations of client 500 may include fewer components, different components, differently arranged components, or additional components than depicted in FIG. 5. For example, although not shown in FIG. 5A, client 500 may include a technical computing environment (e.g., TCE 320) and a library (e.g., library 330).

Program provider 510 may include hardware or a combination of hardware and software that provides one or more programs for execution. For example, in one implementation, program provider 510 may generate programs created using a technical computing environment, as defined above. As shown in FIG. 5, program provider 510 may provide a main program 545 to analysis logic 520.

Analysis logic 520 may receive main program 545, and may include hardware or a combination of hardware and software that analyzes main program 545 and parses main program 545 into one or more program portions 550. In one implementation, analysis logic 520 may include language constructs (as described herein) that parse main program 545 into one or more program portions 550. As shown in FIG. 5, analysis logic 520 may provide program portions 550 to resource allocation logic 530. Further details of analysis logic 520 are provided below.

Resource allocation logic 530 may receive program portions 550, and may include hardware or a combination of hardware and software that dynamically allocates (as indicated by reference number 560) program portions 550 to one or more software UEs (e.g., software UE 410) for parallel execution. Although not shown in FIG. 5A, allocation 560 may be provided to one or more software UEs, and the software UEs may be executed by one or more hardware UEs (e.g., hardware UE 200) in a parallel processing manner. Alternatively and/or additionally, if no external resources (e.g., external software UEs or external hardware UEs) are available, allocation 560 may be executed via software UEs and/or hardware UEs of client 500. The software UEs may return results 570 of the execution of program portions 550 to results provider 540.

Results provider 540 may include hardware or a combination of hardware and software that receives results 570 from the software UEs, and provides results 570 to program provider 510. In one implementation, results provider 540 may combine results 570 into a single result, and may provide the single result to program provider 510.

In one implementation, client 500 may be interactive in that resource allocation logic 530 may permit a user to dynamically control a current setup (e.g., via scripts, functions, command lines, etc.). Thus, client 500 and its configuration may change based on an actual analysis that the user may be currently undertaking. In another implementation, resource allocation logic 530 may be connected to one or more clusters of software UEs 410 and may use processes derived from each of the clusters, as well as client 500, to form the functional components of client 500. In still another implementation, client 500 may include devices having different architectures and/or operating systems (i.e., client 500 may execute across multiple platforms). For example, client 500 may include a different architecture and/or operating system other than software UE 410.

In one example implementation, main program 545 may be submitted in batch manner to a cluster (e.g., a cluster of software UEs 410 and/or a cluster of remote workers 420). For example, a user may interactively develop main program 545, and may save main program 545 in a file (e.g., a MATLAB file). A command may exist in main program 545 (e.g., in the MATLAB file) that may cause one worker (e.g., one of workers 420) in the cluster to act as a client where the execution of main program 545 initiates. Main program 545, for example, may use four workers 420 and a client (e.g., one of workers 420 acting as a client), may initiate on the client, and may utilize as many workers 420 as necessary to carry out execution. In another example, a special type of job may be created that creates a pool (or cluster) of workers, where one of the initiated processes of the job may act as the client, and rest of processes may be in the pool.

Figure 5B:
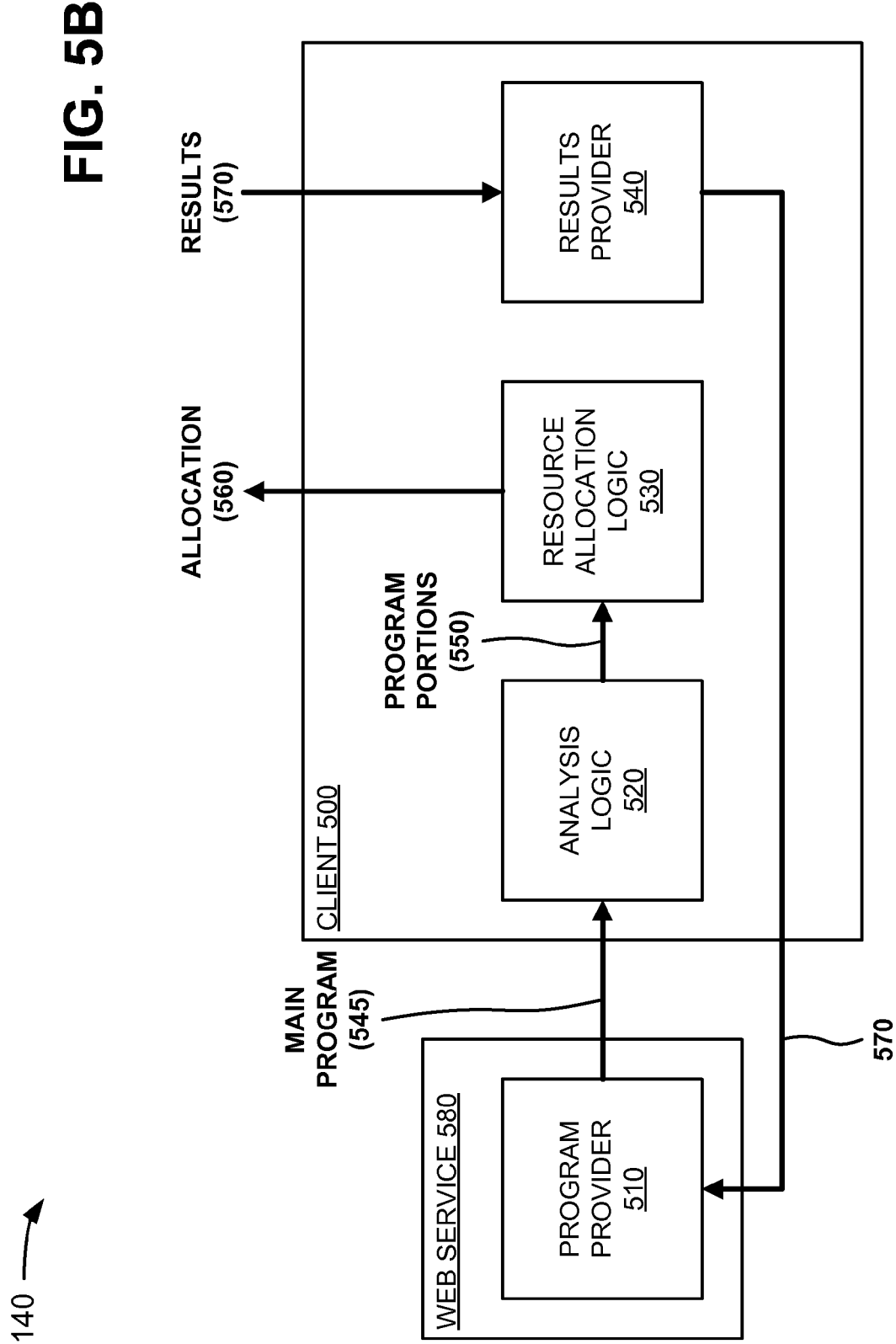
FIG. 5B is a diagram of example functional components of the parallel processing interface in an alternative arrangement.

FIG. 5B is a diagram of example functional components of parallel processing interface 140 in an alternative arrangement. The alternative arrangement depicted in FIG. 5B is the same as the arrangement of FIG. 5A, except that program provider 510 may be included in a web service 580, while analysis logic 520, resource allocation logic 530, and results provider 540 may be include in client 500. Program provider 510, analysis logic 520, resource allocation logic, and/or results provider 540 may operate in the manner as described above in connection with FIG. 5A.

Web service 580 may provide access to one or more programs (e.g., main program 545 provided by program provider 510, applications accessed by main program 545, etc.). A web service may include any software application that allows machine-to-machine communications over a network (e.g., a local area network (LAN), a metropolitan area network (MAN), a wide area network (WAN), such as the Internet, etc.). For example, a web service may communicate with a client (e.g., client 500) using an application program interface (API) that the client may access over the network. The web service may exchange Hypertext Markup Language (HTML), Extensible Markup Language (XML), or other types of messages with the client using industry compatible standards (e.g., simple object access protocol (SOAP)) and/or proprietary standards. A web service may further include network services that can be described using industry standard specifications, such as web service definition language (WSDL) and/or proprietary specifications.

In one example implementation, web service 580 may allow a destination (e.g., a computer operated by a customer) to perform parallel processing using hardware, software, and/or a combination of hardware and software UEs that may be operated by a service provider (e.g., client 500). For example, the customer may be permitted access to client 500 to perform parallel processing if the customer subscribes to one of the offered web services. The service provider may maintain a database that includes parameters, such as parameters that indicate the status of hardware UEs, software UEs, etc. The service provider may perform a look-up operation in the database if a request for parallel processing is received from the customer. The service provider may connect the customer to parallel processing resources that are available based on parameters in the database.

In another example implementation, the customer may receive web service 580 on a subscription basis. A subscription may include substantially any type of arrangement, such as monthly subscription, a per-use fee, a fee based on an amount of information exchanged between the service provider and the customer, a fee based on a number of processor cycles used by the customer, a fee based on a number of hardware UEs, software UEs, etc., used by the customer, etc.

FIG. 5C is a diagram of example functional components of parallel processing interface 140 in another alternative arrangement. The alternative arrangement depicted in FIG. 5C is the same as the arrangement of FIG. 5A, except that analysis logic 520 may be replaced with a parallel processing object API 590. Program provider 510, resource allocation logic 530, and/or results provider 540 may operate in the manner as described above in connection with FIG. 5A.

Parallel processing object API 590 may permit a user to specify how main program 545 may be parallelized. Parallel processing object API 590 may cooperate with resource allocation logic 530 and/or an execution mechanism (e.g., software UEs 420) in a similar manner that analysis logic 520 cooperates with these components. However, parallel processing API 590 may offer much more flexibility and/or customization than analysis logic 520.

Parallel processing API 590 (e.g., a code-based interface) may define and implement an object in a technical computing environment (e.g., TCE 320) that corresponds to another one or more (or set of) executing technical computing environments. Parallel processing API 590 may permit customizable parallelism of a program (e.g., main program 545), and may be nested in other calls or function (e.g., in the parallel processing constructs described herein). Parallel processing API 590 may be used by other calls as inputs to a calling function so that identification of which workers (e.g., workers 420) to use may be known. In one implementation, parallel processing API 590 may be used to provide or initiate a single programming language presentation of distributed arrays, as described herein. For example, in one implementation, parallel processing API 590 may be called a MATLAB® unit of execution (or MUE) API. The MUE API may define and implement an object in MATLAB® software that corresponds to another one or more of executing MATLAB® software applications. The MUE API may be used to permit one technical computing environment to communicate with and control another technical computing environment. The MUE API may be used to create groups of processes with certain behaviors (e.g., using the language constructs described herein).

Although FIGS. 5A-5C show example functional components of parallel processing interface 140, in other implementations, parallel processing interface 140 may include fewer functional components, different functional components, differently arranged functional components, or additional functional components than depicted in FIGS. 5A-5C. In still other implementations, one or more functional components of parallel processing interface 140 may perform one or more other tasks described as being performed by one or more other functional components of parallel processing interface 140.

Example Client/Web Service Architecture

FIG. 6 is a diagram of example components of a device 600 that may correspond to client 500 and/or web service 580. As illustrated, device 600 may include a bus 610, a processing unit 620, a main memory 630, a read-only memory (ROM) 640, a storage device 650, an input device 660, an output device 670, and/or a communication interface 680. Bus 610 may include a path that permits communication among the components of device 600.

Processing unit 620 may include one or more processors, microprocessors, or other types of processing logic that may interpret and execute instructions. In one implementation, processing unit 620 may include a single core processor or a multi-core processor. In another implementation, processing unit 620 may include a single processing device or a group of processing devices, such as a processor cluster or computing grid. In still another implementation, processing unit 620 may include multiple processors that may be local or remote with respect each other, and may use one or more threads while processing. In a further implementation, processing unit 620 may include multiple processors implemented as hardware UEs capable of running copies of a technical computing environment.

Main memory 630 may include a random access memory (RAM) or another type of dynamic storage device that may store information and instructions for execution by processing unit 620. ROM 640 may include a ROM device or another type of static storage device that may store static information and/or instructions for use by processing unit 620. Storage device 650 may include a magnetic and/or optical recording medium and its corresponding drive, or another type of static storage device (e.g., a disk drive) that may store static information and/or instructions for use by processing unit 620.

Input device 660 may include a mechanism that permits an operator to input information to device 600, such as a keyboard, a mouse, a pen, a microphone, voice recognition and/or biometric mechanisms, etc. Output device 670 may include a mechanism that outputs information to the operator, including a display, a printer, a speaker, etc. Communication interface 680 may include any transceiver-like mechanism that enables device 600 to communicate with other devices and/or systems. For example, communication interface 680 may include mechanisms for communicating with another device or system via a network.

As described herein, device 600 may perform certain operations in response to processing unit 620 executing software instructions contained in a computer-readable medium, such as main memory 630. A computer-readable medium may be defined as a physical or logical memory device. A logical memory device may include memory space within a single physical memory device or spread across multiple physical memory devices. The software instructions may be read into main memory 630 from another computer-readable medium, such as storage device 650, or from another device via communication interface 680. The software instructions contained in main memory 630 may cause processing unit 620 to perform processes that will be described later. Alternatively, hardwired circuitry may be used in place of or in combination with software instructions to implement processes described herein. Thus, implementations described herein are not limited to any specific combination of hardware circuitry and software.

Although FIG. 6 shows example components of device 600, in other implementations, device 600 may include fewer components, different components, differently arranged components, or additional components than depicted in FIG. 6. In still other implementations, one or more components of device 600 may perform one or more other tasks described as being performed by one or more other components of device 600.

Example Distributed Array/GPU Array Syntax

FIGS. 7A and 7B are diagrams 700 of example parallel processing constructs capable of being executed by a CPU 220 and/or GPU(s) 210 of hardware UE 200 (FIG. 2). As shown in FIG. 7A, client 500 (e.g., via technical computing environment 320) may generate a distributed array command 710 and a GPU array command 720. TCE 320 may include the features described above in connection with, for example, one or more of FIGS. 1-6.

Distributed array command 710 may specify a layout of data onto a parallel resource set (e.g., workers 420), and may specify which parallel resource set is to be used for a distributed array. Distributed array command 710 may encapsulate such information (e.g., distributed array objects) inside a distributed object representing a distributed class provided outside a distributed array's parallel context. In on implementation, distributed array command 710 (e.g., the distributed class) may be provided to analysis logic 520 (FIG. 5A), and analysis logic 520 may create a parallel distributed object represented by a codistributed class. The codistributed class may be provided inside a distributed array's parallel context. The distributed syntax may include a remote reference to a distributed array, and methods of the distributed syntax may remotely invoke methods of the codistributed syntax. The codistributed syntax may include an instance of the distributed array. As further shown in FIG. 7A, distributed array command 710 may be provided to CPU 220 (or multiple CPUs 220) for execution, as indicated by reference number 730.

In one implementation, distributed array command 710 may enable data parallel processing. In other implementations, distributed array command 710 may be replaced with other data parallel processing constructs (e.g., a single program, multiple data (SPMD) construct), task parallel processing constructs (e.g., a parallel for loop (PARFOR) construct), or stream parallel processing constructs.

GPU array command 720 may provide a mechanism for executing algorithms (e.g., basic arithmetic, FFT and related algorithms, higher level algorithms, etc.) on one or more GPUs 210. In one example, TCE 320 may permit a user to input such algorithms via a command line or script. GPU array command 720 may provide a mechanism for executing user-written TCE 320 program code (or a program file), or a subset of TCE 320 programming language, on one or more GPUs 210. In another example, TCE 320 may automatically execute those portions of TCE 320 program code (e.g., on GPU(s) 210) that may be more efficiently executed on GPU(s) 210 than on CPU 220. In one implementation, TCE 320 may enable GPU-executable program code (e.g., CUDA code) to be executed within TCE 320. For example, TCE 320 may integrate GPU-executable kernels (e.g., CUDA kernels) and operation of these kernels (e.g., with other functionality) into TCE 320. In one example implementation, CUDA texture memory and constant memory may be represented in TCE 320, and TCE 320 may execute kernels that operate on such memory. Texture memory may provide image-processing type applications with various optimizations by supplying automatic interpolation and extrapolation of modes.

GPU array command 720 may enable TCE 320 to determine data associated with execution of a program command by GPU(s) 210, and to send data (e.g., real and complex integer and floating point data types, real logical data types, etc.) to GPU(s) 210 so that GPU(s) 210 may perform operations with the data. This may prevent data from being transferred back and forth between TCE 320 and GPU(s) 210. In one implementation, GPU array command 720 may enable GPU(s) 210 to evaluate functions generated by TCE 320. TCE 320 may use query methods to retrieve information about GPU(s) 210, and may use the retrieved information to select a particular GPU 210 (e.g., from multiple GPU(s) 210 provided on cluster machines) for execution of GPU array command 720.

In one example, GPU array command 720 (e.g., and its associated programs and/or data) may be automatically provided from client 500 (e.g., TCE 320) to a local GPU (e.g., provided in client 500), to a local CPU (e.g., provided in client 500), to a remote CPU (e.g., provided in hardware UE 200), and finally to remote GPU(s) (e.g., provided in hardware UE 200). The term "local," as used herein, is to be broadly construed to include being provided internal to client 500 and/or TCE 320. The term "remote," as used herein, is to be broadly construed to include being provided external to client 500 and/or TCE 320. GPU array command 720 may access local or remote GPUs in a variety of ways. For example, GPU array command 720 may access a local GPU directly, or may access a remote GPU (e.g., provided in hardware UE 200) that is under the control of client 500. In another example, GPU array command 720 may permit interactive or batch operations with direct communication between client 500 and remote GPUs (e.g., provided in hardware UE 200).

In another example, TCE 320 may automatically associate a particular worker 420 to a particular GPU 210 correctly (e.g., to tie the particular worker 420 to the particular GPU 210). Each worker 420 may select its own GPU 210 if enough GPUs 210 are available for a one-to-one correspondence between workers 420 and GPUs 210.

As further shown in FIG. 7A, GPU array command 720 may be provided to GPUs 210-1, 210-2, 210-3, and 210-4 for execution, as indicated by reference numbers 740-1, 740-2, 740-3, and 740-4, respectively. In one implementation, such an arrangement may enable simultaneous use of multiple GPUs 210 during a single TCE 320 session. Alternatively, as shown in FIG. 7B, GPU array command 720 may be provided to a single GPU 210 for execution, as indicated by reference number 750.

In one example implementation, GPU array command 720 may include a gpuArray or GPUArray command (associated with a convenience application program interface (API)). In TCE 320, the gpuArray command may represent data that is stored on a GPU (e.g., GPU 210). For example, a user can use the gpuArray command to transfer an array (M) from TCE 320 to GPU 210 as follows:

M=magic(N);
G=gpuArray(M);

where G may be a GPU array that represents data (magic (N)) of an array (M) stored on GPU 210. GPU arrays may be constructed from any numeric or logical array generated by TCE 320.

In one example implementation, client 500 may initiate TCE 320, and may receive, vie TCE 320, a program command (e.g., GPU array command 720) that permits TCE 320 to access GPU 210. The program command may permit data associated with a GPU array to be seamlessly transferred to GPU 210. Client 500 may transform, via TCE 320, the program command into a program command that is executable by GPU 210, and may provide the transformed program command to GPU 210 for execution (e.g., as indicated by reference number 750). Client 500 may receive, from GPU 210, results associated with execution of the transformed program command by GPU 210, and may utilize the results via TCE 320. In one example, GPU 210 may seamlessly transfer the data to another GPU 210.

Although FIGS. 7A and 7B show example parallel processing constructs, in other implementations, TCE 320 may generate fewer parallel processing constructs, different parallel processing constructs, or additional parallel processing constructs than depicted in FIGS. 7A and 7B.

Figure 8:
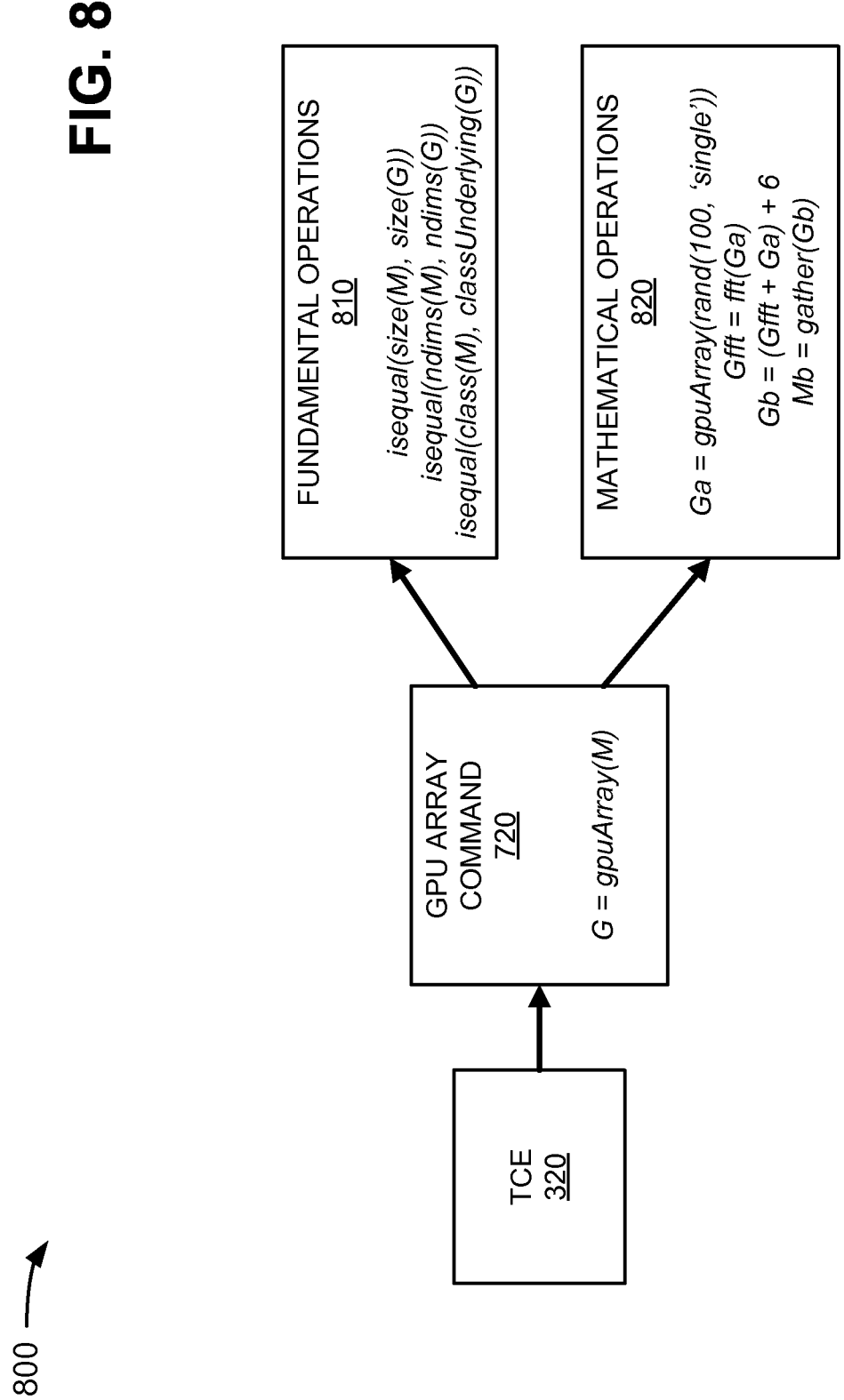
FIG. 8 is a diagram of an example GPU array construct capable of being generated by a technical computing environment of FIG. 3.

FIG. 8 is a diagram 800 of an example GPU array construct capable of being generated by TCE 320. As shown, TCE 320 may generate GPU array command 720. TCE 320 and GPU array command 720 may include the features described above in connection with, for example, one or more of FIGS. 1-7B. As further shown in FIG. 8, GPU array command 720 may produce categories of operations, such as fundamental operations 810 and mathematical operations 820.

Fundamental operations 810 may include operations relating to creation and querying of basic properties (e.g., size, numel, ndims, etc.). The GPU array (G) may behave similarly to a numeric array (M) provided by TCE 320, with the difference being that computations of the GPU array are executed by a GPU (e.g., GPU 210). Fundamental operations 810 or queries, such as size of an array (size), length of an array (length), dimensions of an array (ndims), whether an array is real (isreal), etc. may return the same values for the GPU array (G) as they would for the numeric array (M) as shown by the following syntax:

isequal(size(M), size(G)) % returns true
    isequal(ndims(M), ndims(G)) % returns true
    isequal(class(M), classUnderlying(G)) % returns true,
where the classUnderlying function may be used to access a class of individual elements of the GPU array (G).

Mathematical operations 820 may be carried out on the GPU array (G) and the calculations may take place on a GPU (e.g., GPU 210). For example, mathematical operations 820 may include the following syntax:

Ga=gpuArray(rand(100, 'single'));
    Gfft=fft(Ga);
    Gb=(Gfft+Ga)*6;
    Mb=gather(Gb).

The gather function may return data from the GPU (e.g., GPU 210) memory back to a TCE 320 numeric array. A user may receive an "error" if a given function is not implemented for a GPU array.

Fundamental operations 810 and mathematical operations 820 may be easily implemented via TCE 320, and may enable a user to interactively experiment from a TCE 320 command line. Fundamental operations 810 and mathematical operations 820 may provide syntax familiar to TCE 320 users (e.g., TCE 320 functions may work if GPU arrays are passed as inputs), and may provide a natural mechanism for accessing pre-packaged library 330 routines (e.g., FFT, sort, find, min/max, etc.).

Although FIG. 8 shows example operations produced by GPU array command 720, in other implementations, GPU array command 720 may provide fewer operations, different operations, or additional operations than depicted in FIG. 8.

Example Compiling of TCE Constructs

Figure 9:
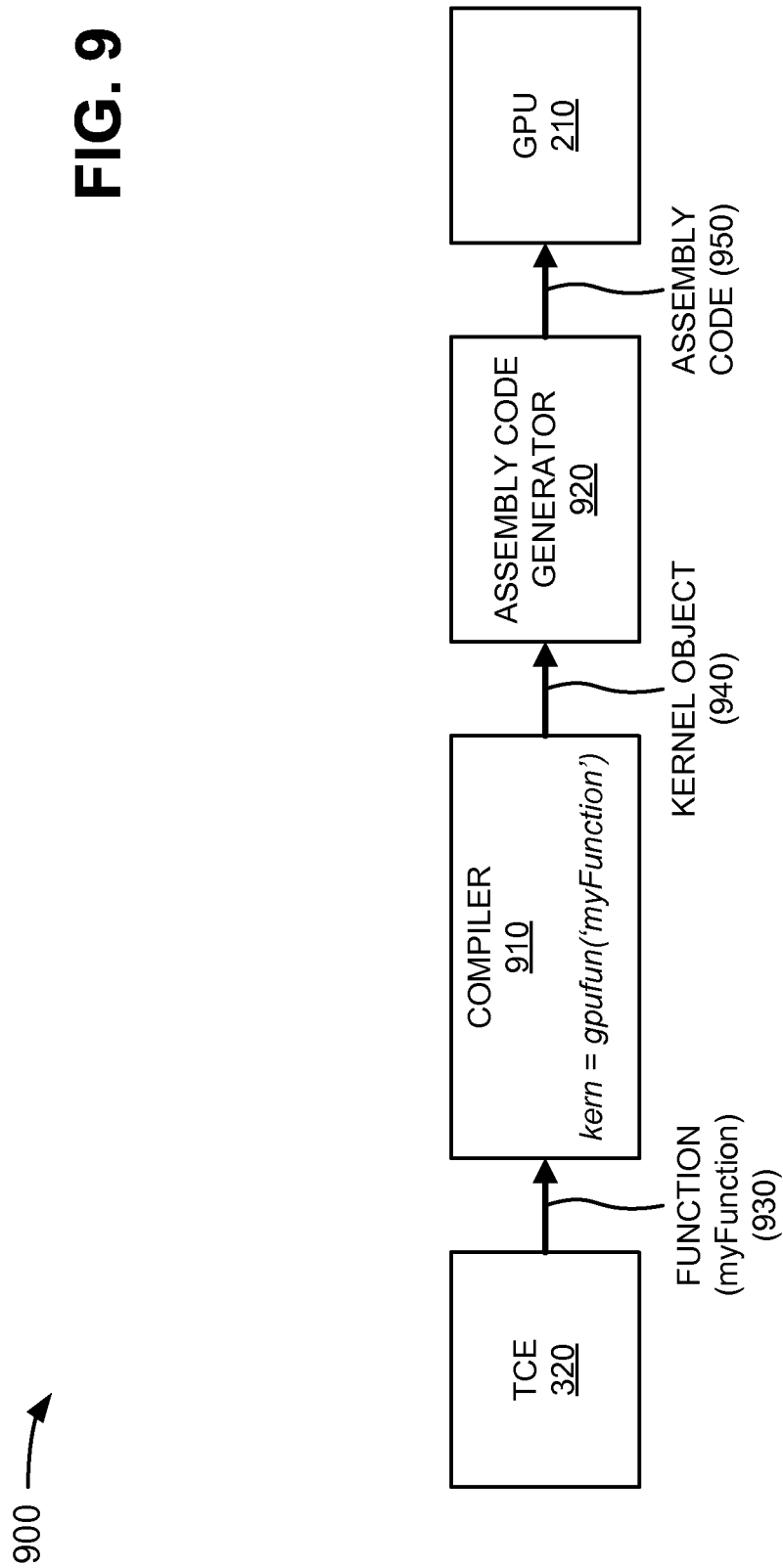
FIG. 9 is diagram of an example compiling operation performed on a technical computing environment construct so that the construct may be executed by a GPU.

FIG. 9 is diagram 900 of an example compiling operation performed on a TCE 320 construct so that the TCE 320 construct may be executed by GPU 210. As shown, TCE 320 may interact with GPU 210 via a compiler 910 and an assembly code generator 920. In one implementation, compiler 910 and assembly code generator 920 may be provided in client 500. GPU 210 and TCE 320 may include the features described above in connection with, for example, one or more of FIGS. 1-8.

Compiler 910 may include hardware or a combination of hardware and software that receives an algorithm (e.g., a function 930, such as myFunction) written in TCE 320, and compiles the algorithm (e.g., function 930) into a kernel object 940 that may be executed by GPU 210. In one example implementation, compiler 910 may include a TCE 320 to CUDA compiler. Kernel object 940 may include many different underlying kernels, depending on sizes and types of inputs to function 930, and may include an object that knows how to execute the correct code on GPU 210. Taking an entire algorithm and executing it as one kernel (e.g., kernel object 940) on GPU 210 may be more efficient than a GPU array approach. Kernel object 940 may share many of the properties of lower-level kernel objects described below in connection with FIG. 10, and may be automatically adapted to the sizes and types of inputs to function 930. In one example, compiler 910 may construct kernel object 940 (kern) as follows:

kern=arrayfun('myFunction').

If function 930 includes constructs that are not convertible for execution by GPU 210, compiler 910 may generate an error. As further shown in FIG. 9, compiler 910 may provide kernel object 940 to assembly code generator 920. In one example, the function (arrayfun) may pass in a regular array or a GPU array.

Kernel object 940 may represent an ability to call a single method on GPU 210. A method (e.g., a feval method) may be used to execute an actual kernel on GPU 210. Before a kernel can be executed, a driver and GPU 210 may need to know about the existence of the kernel. An exact implementation of kernel object 940 may depend on a platform on which a user is working (e.g., CUDA, OpenCL, etc.), but an API may remain consistent across the different platforms. TCE 320 may include a common kernel interface that enables users to utilize kernels provided by compiler 910 (e.g., a TCE 320 to CUDA compiler), as well as CUDA kernels constructed by a user from parallel thread execution (PTX) code (as described below in connection with FIG. 10). A mechanism for executing both types of kernels may be the same, but each type of kernel may have a different set of properties to configure execution.

The common kernel interface may be defined through an abstract superclass called parallel.gpu.Kernel. The parallel.gpu.Kernel class may define properties, such as NumRHSArguments (e.g., a number of right-hand side arguments to be provided when calling the feval method), and MaxNumLHSArguments (e.g., a maximum number of left-hand side results that can be requested when calling the feval method). The parallel.gpu.Kernel class may define a single method (e.g., [gy1,gy2, . . . ]=feval(K,x1,x2,x3, . . . )) that causes a function represented by kernel object 940 to be executed on GPU 210. The input arguments may be either standard TCE 320 arrays or GPU arrays. Each return argument may be of type GPUArray. An underlying class of the GPU array may be a TCE 320 type such as a single, a double, etc., as determined by the kernel prototype.

Kernel object 940 may be used with a variety of different input types and sizes, and the feval method may automatically adapt execution as appropriate. Kernel object 940 may be constructed from text of a TCE 320 function file (e.g., function 930). TCE 320 function files may include TCE 320 function files containing a single function, a function that contains element-wise operations and assignments on full numeric/logical data types, etc.

Assembly code generator 920 may include hardware or a combination of hardware and software that receives kernel object 940 from compiler 910, and converts kernel object 940 into assembly code 950. Assembly code 950 may include kernel object 940 (e.g., or function 930) provided in a form that is understandable by GPU 210. In one example implementation, assembly code 950 may include all data needed for execution of function 930 by GPU 210. This may prevent copying of data back and forth between TCE 320 and GPU 210, which may save time. As further shown in FIG. 9, assembly code generator 920 may provide assembly code 950 to GPU 210 for execution.

Compiler 910 and assembly code generator 920 may enable execution of a combination of operations in a single kernel invocation (which may improve performance), and may provide a simple mechanism for creating computational kernels for GPUs. The arrangement depicted in FIG. 9 may permit a user to prototype code (e.g., via TCE 320) that may be executed by GPU 210.

Although FIG. 9 shows an example compiling operation performed on a TCE 320 construct, in other implementations, fewer operations, different operations, or additional operations may be performed on the TCE 320 construct than depicted in FIG. 9.

Example TCE Interface for GPU-Executable Kernels

Figure 10:
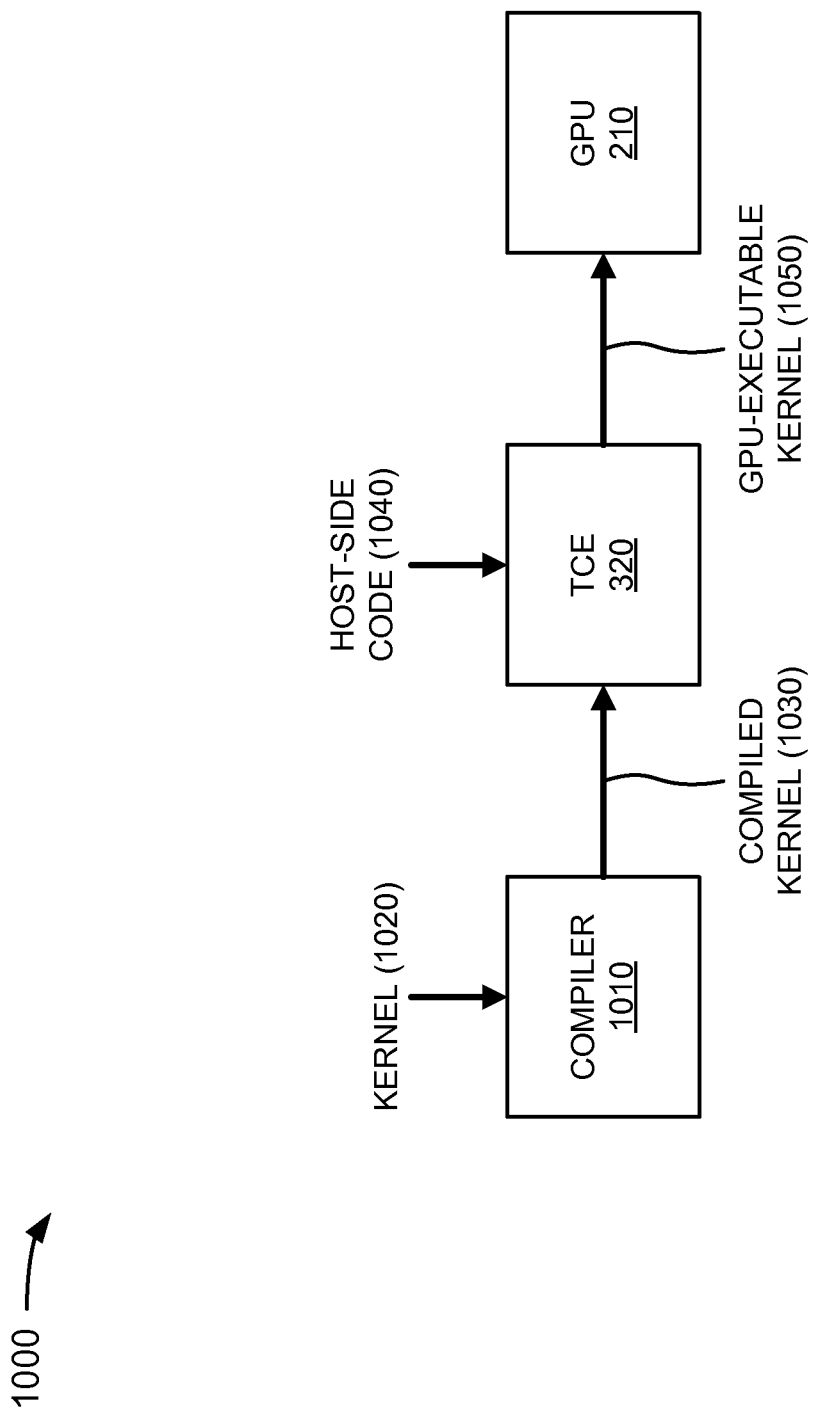
FIG. 10 is a diagram depicting creation of an example kernel that may be executed by a GPU.

FIG. 10 is a diagram 1000 depicting creation of an example kernel that may be executed by GPU 210. As shown, TCE 320 may interact with a compiler 1010 and GPU 210. In one implementation, compiler 1010 may be provided in client 500. GPU 210 and TCE 320 may include the features described above in connection with, for example, one or more of FIGS. 1-9.

Advanced users may be comfortable constructing their own kernels (e.g., CUDA kernels created using the CUDA language), or may have existing kernels that they wish to execute on GPU 210. For example, as shown in FIG. 10, a user may provide a kernel 1020 (e.g., a kernel that the user wants to be executed by GPU 210) to compiler 1010. In one example, kernel 1020 may include a CUDA (or a ".cu") file that contains various "_global_" entry points (e.g., as a user would create if they were to invoke a kernel in a CUDA manner).

Compiler 1010 may include hardware or a combination of hardware and software that receives kernel 1020 (e.g., the CUDA file), and compiles kernel 1020 to produce a compiled kernel 1030 (e.g., that may be executed by GPU 210). In one example implementation, compiler 1010 may include a CUDA compiler that compiles the CUDA code into an executable PTX code (e.g., executable by GPU 210). For example, kernel 1020 may include the following CUDA kernel:

```
// contents of file: CUDAAddScalar.cu
_global_ void addScalar(double * out, const double * in,
    double offset) {
        int myThread = < calculate thread index >;
        out[myThread] = in[myThread] + offset;
}.
```

Compiler 1010 may compile this CUDA kernel to produce compiled kernel 1030 of the following format:
$ nvcc -ptx CUDAAddScalar.cu -o CUDAAddScalar.ptx.
As further shown in FIG. 10, compiler 1010 may provide compiled kernel 1030 to TCE 320.

When users supply compiled kernel 1030 to TCE 320, information about types and sizes of input arguments (e.g., out and in) to the kernel code may be lost. To use compiled kernel 1030 in a CUDA setting, the user may write host-side code 1040, and may provide host-side code 1040 to TCE 320. Host-side code 1040 may provide instructions for allocating memory on GPU 210 for out and in arguments, instructions to enable TCE 320 to perform size and type conversions and checking, and instructions for invoking compiled kernel 1030 in such a way as to have one thread per element of out arguments. TCE 320 may receive compiled kernel 1030 and host-side code 1040, and may produce a GPU-executable kernel 1050 based on compiled kernel 1030 and host-side code 1040. GPU-executable kernel 1050 may include a GPU-executable form of kernel 1020. In one example, GPU-executable kernel 1050 may include the following syntax:
    m=rand(100, 1);
    g=gpuArray(m);
    k=parallel.gpu.CUDAKernel('CUDAAddScalar.ptx', 'CUDAAddScalar.cu');
    gy=feval(k, g, 1.234); % adds 1.234 to g
    gy2=feval(k, m, 1.234); % equivalent to line above.
In another example, GPU-executable kernel 1050 may be used in conjunction with GPU array operations, such as in the following syntax:
    G=gpuArray(m);
    k=parallel.gpu.CUDAKernel('CUDAAddScalar.ptx', 'CUDAAddScalar.cu');
    % set up k as required . . .
    G2=feval(k, G);
    G3=G2*G;
    G4=feval(k, G3−1);
    result=gather(G4).
As further shown in FIG. 10, TCE 320 may provide GPU-executable kernel 1050 to GPU 210 for execution.

The syntax of the constructor parallel.gpu.CUDAKernel may include:
    K=parallel.gpu.CUDAKernel(ptxFileName)
    K=parallel.gpu.CUDAKernel(ptxFileOrText, protoString)
    K=parallel.gpu.CUDAKernel(ptxFileOrText, protoString)
    K=parallel.gpu.CUDAKernel(ptxFileOrText, cuFileName)
    K=parallel.gpu.CUDAKernel(ptxFileOrText, cuFileOrProto, entryName).
The argument, ptxFileName, may be a name of a ".ptx" file containing compiled CUDA code. If neither protoString nor cuFileName is provided, then a cuFileName may be assumed by replacing ".ptx" with ".cu" in the ptxFileName. The argument, ptxFileOrText, may be either the name of a ".ptx" file, or a string containing the contents of a ".ptx" file. The argument, protoString, may be a string describing the argument list of the kernel. The argument, cuFileName, may be a name of a ".cu" file containing the CUDA code from which the ".ptx" code was generated. The argument, entryName, may specify a name of a kernel entry point defined in the PTX code. In one example implementation, GPU 210 may change a data type (e.g., associated with GPU-executable kernel 1050) so that the data type may be compatible with TCE 320.

In order to ensure that compiled kernel 1030 is invoked with the correct arguments from TCE 320, a description of an interface to the kernel may be provided in the CUDA code. This can be provided by supplying the entire ".cu" file or by supplying an argument list for a particular entry point. In general, an argument list of compiled kernel 1020 may be specified in terms of a comma-separated list of simple built-in C types. Each argument may be a pointer or a value, and pointers may or may not be constant-qualified. For example, the arguments may include:

logicalType ::bool
intType ::char|short|int|long|long long
uintType ::unsigned intType
cplxIntType ::char2|short2|int2|long2|longlong2
cplxUintType ::uchar2|ushort2|uint2|ulong2|ulonglong2
allIntType ::intType|uintType|cplxIntType|cplxUintType
floatType ::float|double
cplxFloatType ::float2|double2
allFloatType ::floatType|cplxFloatType
scalarType ::logicalType|allIntType|allFloatType
pointerType ::scalarType*
constPointerType ::const pointerType
validArg ::scalarType|pointerType|constPointerType varName
validArgList ::validArg (, validArg)*

Any scalar and constant-qualified arguments may be treated as inputs when compiled kernel 1030 is invoked. Any non-constant-qualified pointer arguments may be treated as in-out arguments (i.e., an original value may be used by compiled kernel 1030, and a new value may be passed as a result to TCE 320).

The CUDA programming model may assume that when compiled kernel 1030 is launched each of a multitude of threads that are concurrently executing the kernel may be arranged in a specific way. The model states that those threads common to a thread block can have a shared memory space, and can synchronize with each other. Those threads that are not common to a thread block may neither communicate nor synchronize with each other. The total number of threads launched by a kernel call may equal a thread block size (ThreadBlockSize) multiplied by a grid size (GridSize), and may not exceed a predetermined value (MaxThreadsPerBlock).

When compiled kernel 1030 is launched, a user may need to specify a size for a block of threads (ThreadBlockSize) that co-operate on compiled kernel 1030. This size may be an integer vector of length 1, 2, or 3 (since thread blocks can be up to three dimensions). On current CUDA devices a total number of threads in a block may not exceed "512" and so the product of the integers (e.g., for thread block size) supplied may be checked against a GPU's capabilities. The grid size (GridSize) may include a size of grid (e.g., a number of thread blocks that will be launched independently by GPU 210). This size may be an integer vector of length 1 or 2. There may be no upper bound on the product of these integers.

A shared memory size (SharedMemorySize) may specify an amount of dynamic shared memory that each thread block can use (e.g., in bytes). Each thread block may have an available shared memory region. The size of this region may be limited in CUDA devices (e.g., to about sixteen kilobytes) and may be shared with registers on multi-processors. The shared memory region may be allocated before compiled kernel 1030 is launched. The size of this shared memory region may be tied to the size of the thread block. Setting this value on compiled kernel 1030 may ensure that each thread in a thread block can access this available shared memory region.

A string (EntryPoint) may contain an entry point name in the PTX code that compiled kernel 1030 may call. An argument (MaxNumLHSArguments) may include a maximum number of left hand side arguments that compiled kernel 1030 supports. It may not be greater than the number of right hand side arguments. An argument (NumRHSArguments) may include a number of right hand side arguments needed to call compiled kernel 1030.

A cell array of strings (ArgumentTypes) may have the same length as NumRHSArguments. Each of the strings may describe an expected TCE 320 type for an input. In addition, if an argument is only an input to compiled kernel 1030 then it may be prefixed by an in argument, and if it is an input/output then it may be prefixed by an inout argument. This may permit a user to determine how to efficiently call compiled kernel 1030 with TCE 320 data and a GPU array, and to determine which of compiled kernel 1030 inputs are being treated as outputs.

In one example implementation, default values may be provided for one or more of ThreadBlockSize, MaxThreadsPerBlock, GridSize, SharedMemorySize, EntryPoint, MaxNumLHSArguments, NumRHSArguments, and ArgumentTypes. However, a user may override one or more of these default values.

The parallel.gpu.CUDAKernel object may utilize the feval method with the syntax:

[y1,y2, . . . yn]=arrayfun(@myfunction,x1,x2, . . . xn).

This method may invoke an instance of compiled kernel 1030 on GPU 210, may set the SharedMemory, ThreadBlockSize, and GridSize (e.g., using inputs provided in x1, x2, . . . ), and may set requested outputs in y1, y2, . . . .

The arrangement depicted in FIG. 10 may provide users of existing kernels (e.g., CUDA code) with an easy way to utilize such kernels within TCE 320. Although FIG. 10 shows creation of an example GPU-executable kernel 1050, in other implementations, different GPU-executable kernels may be created than described in connection with FIG. 10.

Example GPU Array Operations

Figure 11:
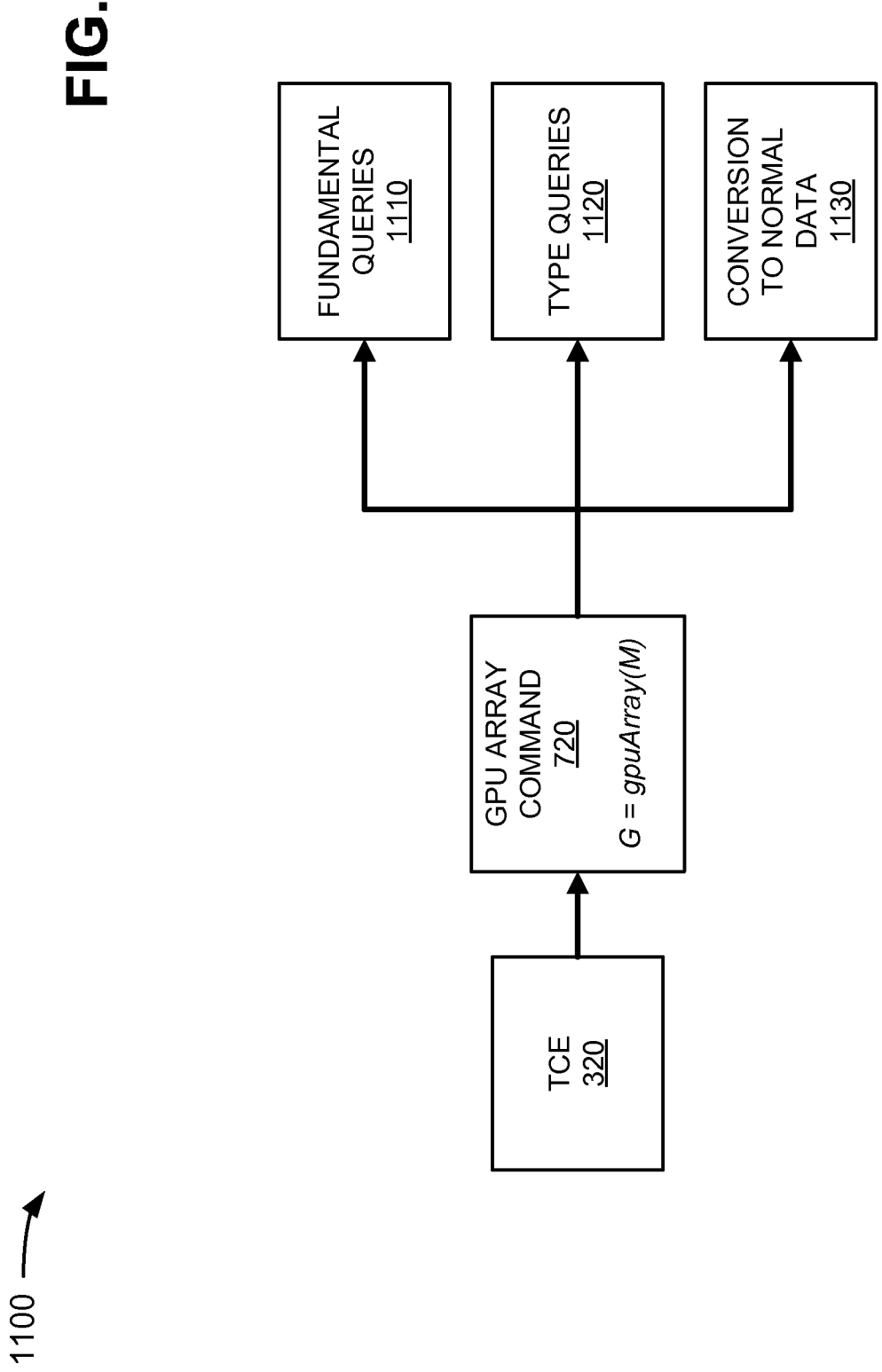
FIG. 11 is a diagram of example operations that may be provided by a GPU array construct.

FIG. 11 is a diagram 1100 of example operations that may be provided by a GPU array construct. As shown, TCE 320 may generate GPU array command 720. TCE 320 and GPU array command 720 may include the features described above in connection with, for example, one or more of FIGS. 1-10. As further shown in FIG. 11, GPU array command 720 may provide a variety of operations, such as fundamental queries 1110, type queries 1120, and conversion to normal data methods 1130.

Fundamental queries 1110 may include methods that query fundamental properties (e.g., fundamental operations 810) of a GPU array. For example, fundamental queries 1110 may include the following example syntax:

Ne=numel(G) % returns a number of elements
Sz=size(G) % returns size as a vector
[sz1, sz2, . . . ]=size(g) % multiple return of size
Tf=isreal(G) % returns true for non-complex G
Tf=issparse(G) % returns a false.

In one implementation, the results of fundamental queries 1110 may be the same as if the same function had been called on TCE 320 array (M) from which the GPU array (G) was created. In other implementations, fundamental queries 1110 may include other types of syntax.

Type queries 1120 may provide additional basic functionality. For example, a type query 1120 of the following example syntax:

Cls=classUnderlying(G) % same as class(M), may return a class of underlying data from which the GPU array (G) was created. In another example, a type query 1120 of the following example syntax:

Tf=isaUnderlying(G, 'class') % same as isa(M, 'class'), may return a logical value corresponding to an equivalent call to isa(M, 'class'). In other implementations, type queries 1120 may include other types of syntax.

Conversion to normal data methods 1130 may include methods that normalize data associated with the GPU array (G). For example, conversion to normal data methods 1130 may include a gather function that retrieves values of the GPU array (G) and creates an equivalent standard array (M). In one example implementation, the gather function may include the following syntax:

M2=gather(G); % isequal(M2, M) returns true.

Although FIG. 11 shows example operations produced by GPU array command 720, in other implementations, GPU array command 720 may provide fewer operations, different operations, or additional operations than depicted in FIG. 11.

Example Build Functions

Figure 12:
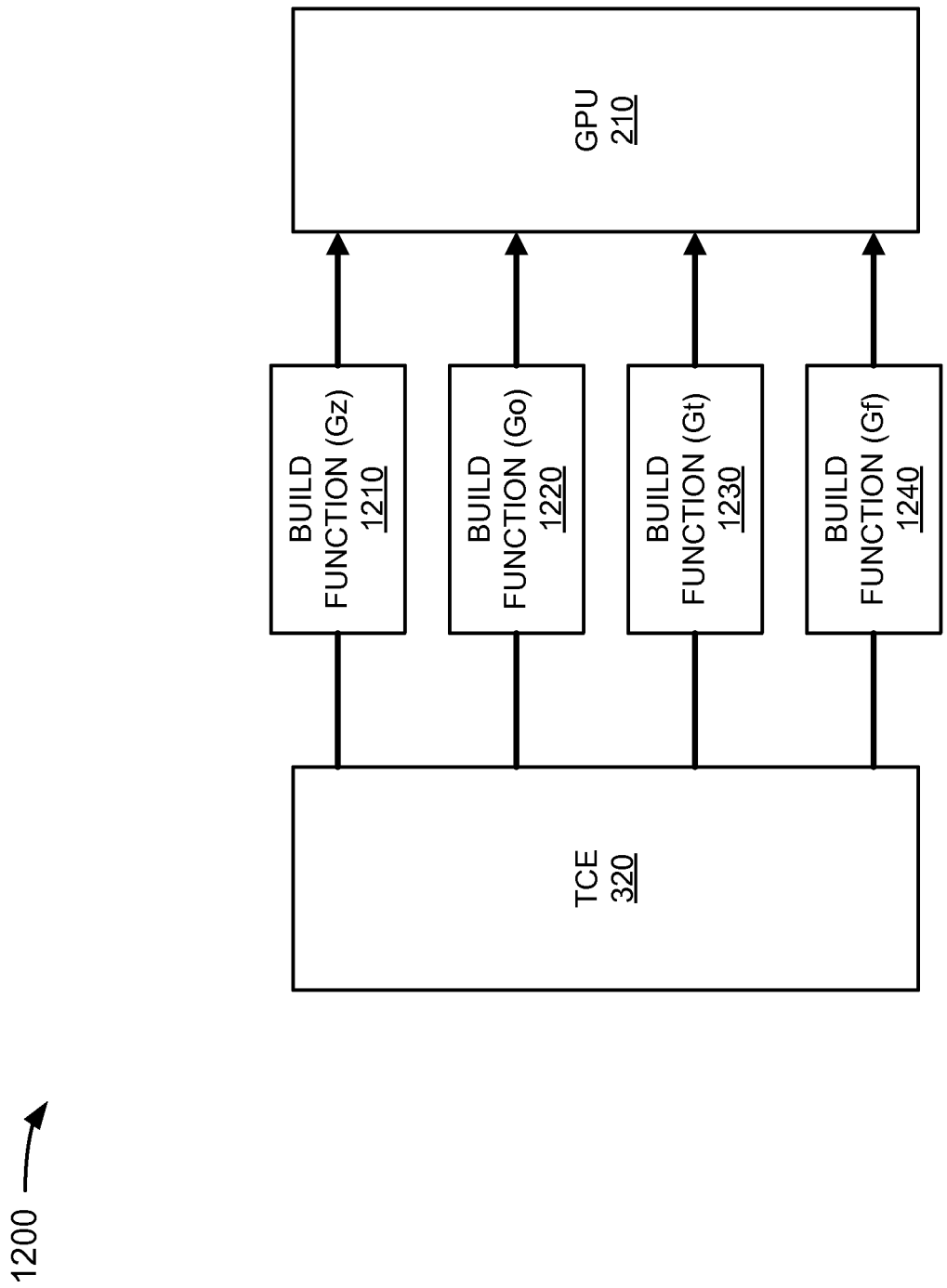
FIG. 12 is a diagram of example static build functions that may be provided by a technical computing environment to a GPU.

FIG. 12 is a diagram 1200 of example static build functions that may be provided by TCE 320 to GPU 210. TCE 320 and GPU 210 may include the features described above in connection with, for example, one or more of FIGS. 1-11. As further shown in FIG. 12, TCE 320 may provide a first build function (Gz) 1210, a second build function (Go) 1220, a third build function (Gt) 1230, and a fourth build function (Gf) 1240 to GPU 210.

While most use cases may be satisfied by a GPU array constructor, there may be occasions where, for maximum efficiency, GPU arrays may be constructed on GPU 210 via static build functions, such as build functions 1210-1240. In one example use case, a static build function may be provided by TCE 320 when a compiler (e.g., compiler 910 or compiler 1010) knows how to pre-allocate its outputs (e.g., because it may be inefficient to copy zeros to GPU 210 in such a situation). In another example use case, a static build function may be provided by TCE 320 when a parallel number generator on GPU 210 may be significantly faster than generating random numbers on a host (e.g., client 500).

First build function (Gz) 1210 may include hardware or a combination of hardware and software that provides an array of all zeros (0s) according to the following syntax:

Gz=parallel.gpu.GPUArray.zeros(szArg, optClass) % array of all zeros, where szArg may include a comma-separated list of dimensions, or a dimension vector.

Second build function (Go) 1220 may include hardware or a combination of hardware and software that provides an array of all ones (1s) according to the following syntax:

Go=parallel.gpu.GPUArray.ones(szArg, optClass) % array of all ones.

Third build function (Gt) 1230 may include hardware or a combination of hardware and software that provides a logical array of "true" according to the following syntax:

Gt=parallel.gpu.GPUArray.true(szArg) % logical array of true.

Fourth build function (Gf) 1240 may include hardware or a combination of hardware and software that provides a logical array of "false" according to the following syntax:

Gt=parallel.gpu.GPUArrayfalse(szArg) % logical array of false.

For first build function 1210 and second build function 1220 (e.g., for ones and zeros), a classUnderlying of a result may be determined by specifying an optClass, which might be one of a number of TCE 320 numeric types. If optClass is not specified, a default classUnderlying may be double.

Although FIG. 12 shows example static build functions that may be provided by TCE 320, in other implementations, TCE 320 may provide fewer static build functions, different static build functions, or additional static build functions than depicted in FIG. 12.

Comparison of GPU Arrays and Distributed Arrays

FIG. 13 is a table 1300 of example features of a GPU array construct as compared to features of a distributed array construct. As shown, table 1300 may include a feature field 1310, a GPUArray field 1320, a distributed field 1330, and a variety of entries 1340 associated with fields 1310-1330. As shown by table 1300, the features of the GPU array construct (e.g., as identified in GPUArray field 1320) may include many conceptual similarities with the features of the distributed array construct (e.g., as identified in distributed field 1330).

Feature field 1310 may include a variety of example entries 1340 (e.g., features) for comparing the GPU array construct and the distributed array construct. For example, feature field 1310 may include a construction entry 1340 that identifies syntax associated with a GPU array construct (e.g., G=gpuArray(X), as indicated in field 1320) and identifies syntax associated with a distributed array construct (e.g., D=distributed(X), as indicated in field 1330). Feature field 1310 may also include a build entry 1340 that identifies syntax for building a GPU array (e.g., gpuArray(ones(M,N,class)) or parallel.gpu.GPUArray.ones(M,N,class), as indicated in field 1320) and identifies syntax for building a distributed array (e.g., distributed.ones(M,N,class), as indicated in field 1330).

As further shown in FIG. 13, feature field 1310 may include a retrieve data entry 1340 that identifies syntax associated with retrieving data from a GPU array (e.g., X=gather (G), as indicated in field 1320) and with retrieving data from a distributed array (e.g., X=gather(D), as indicated in field 1330). Feature field 1310 may include a class entry 1340 that identifies syntax associated with identifying a class of a GPU array (e.g., Class(G)=='parallel.gpu.GPUArray', as indicated in field 1320) and with identifying a class of a distributed array (e.g., Class(D)=='distributed', as indicated in field 1330). Feature field 1310 may further include an entry 1340 ("How big is it?") that identifies syntax associated with identifying a size of a GPU array (e.g., s=size(G), as indicated in field 1320) and with identifying a size of a distributed array (e.g., s=size(D), as indicated in field 1330).

Another entry 1340 ("What type does it hold?") of feature field 1310 may identify syntax associated with identifying a data type contained in a GPU array (e.g., c=classUnderlying (G) or tf=isaUnderlying(G, 'class'), as indicated in field 1320) and with identifying a data type contained in a distributed array (e.g., c=classUnderlying(D) or tf=isaUnderlying (D, 'class'), as indicated in field 1330). Still another entry 1340 ("Is it real?") of feature field 1310 may identify syntax associated with identifying whether a GPU array is real (e.g., isR=isreal(G), as indicated in field 1320) and with identifying whether a distributed array is real (e.g., isR=isreal(D), as indicated in field 1330).

As further shown in FIG. 13, feature field 1310 may include an entry 1340 (Overloads in general) that identifies syntax associated with identifying overloads of a GPU array (e.g., G=G1+G2*cos(G3), as indicated in field 1320) and with identifying overloads of a distributed array (e.g., D=D1+D2*cos(D3), as indicated in field 1330). Feature field 1310 may also include an entry 1340 (Unary overloads) that identifies syntax associated with identifying unary overloads of a GPU array (e.g., G sin=sin(G) or Gfft=fft(G), as indicated in field 1320) and with identifying unary overloads of a distributed array (e.g., D sin=sin(D) or Dfft=fft(D), as indicated in field 1330). Feature field 1310 may further include an entry 1340 (Binary overloads) that identifies syntax associated with identifying binary overloads of a GPU array (e.g., G=G1+G2, as indicated in field 1320) and with identifying binary overloads of a distributed array (e.g., D=D1+D2, as indicated in field 1330).

As shown in table 1300, a functional difference between the GPU array and the distributed array is that the GPU array does not require static constructor methods (e.g., GPUArray.ones). This difference arises because a GPU (e.g., GPU 210) may have a comparable amount of memory as a host (e.g., client 500), and data may be easily constructed in GPU 210 and transferred. With the distributed array, a CPU may have much more memory available than the host. However, automated tools (e.g., various compiler technologies) and advanced users may wish to avoid the overhead of allocating memory on the host for the purposes of creating GPU arrays.

With regard to timescales, for distributed array operations, a loss of milliseconds to seconds preparing for an operation is acceptable. For GPU array operations, this number drops to microseconds. Thus, GPU array operations may need to be dispatched more efficiently than distributed array operations. With regard memory allocation, there may be a need to know a size of an output before the output is calculated by GPU 210. Therefore, for GPU arrays, all memory allocations may be performed before a calculation by GPU 210.

Although FIG. 13 shows example features of the GPU array construct as compared to features of the distributed array construct, in other implementations, fewer features, different features, or additional features, than depicted in FIG. 13, may be associated with the GPU array construct and/or the distributed array construct.

Example Information Exchanged Between TCE and GPUS

FIG. 14 is a diagram 1400 of example information that may be exchanged between TCE 320 and multiple GPUs 210 (e.g., provided in hardware UE 200). TCE 320, hardware UE 200, and GPUs 210 may include the features described above in connection with, for example, one or more of FIGS. 1-13.

Users may have more than one GPU 210 accessible to them (e.g., in hardware UE 200). A single TCE 320 session may have access to a single GPU 210 at a time. However, a currently active GPU 210 may be changed at run time. TCE 320 may provide users with mechanism for discovering how many GPUs 210 are available, selecting a particular GPU 210 to be a current GPU 210, and discovering properties of the currently selected GPU 210. TCE 320 may also provide users with a mechanism for resetting a GPU 210 device (e.g., when previous kernel invocations have put GPU 210 in a poor state). TCE 320 may provide these mechanisms via a GPUDevice object or a parallel.gpu.GPUDevice object.

Before selecting a GPU 210, it may be necessary to know how many GPUs 210 are available to TCE 320. As shown in FIG. 14, TCE 320 may provide a query 1410 (e.g., requesting a number of GPUs 210 on hardware UE 200) to hardware UE 200. In response to query 1410, hardware UE 200 may return an indication 1420 of a number of GPUs 210 on hardware UE 200 (e.g., there may be four GPUs 210). In one example, query 1410 may include the following syntax:

numDevices=parallel.gpu.GPUDevice.count( ).

Alternatively, query 1410 may include the following syntax (e.g., using a convenience API):

numDevices=gpuDeviceCount( ).

TCE 320 may access a currently selected GPU 210 by providing a query 1430 (e.g., requesting access to a currently selected GPU 210) to hardware UE 200. In response to query 1430, hardware UE 200 may return an indication 1440 of access to a currently selected GPU 210. In one example, query 1430 may include the following syntax:

dev=parallel.gpu.GPUDevice.current( ).

Alternatively, query 1430 may include the following syntax (e.g., using the convenience API):

dev=gpuDevice( ).

TCE 320 may wish to select a different GPU 210 than a currently selected GPU 210. TCE 320 may select a different GPU 210 by providing a query 1450 (e.g., requesting selection of a different GPU 210) to hardware UE 200. In response to query 1450, hardware UE 200 may provide TCE 320 with access to a different GPU 210. In one example, query 1450 may include the following syntax:

newlySelectedDev=parallel.gpu.GPUDevice.select(idx), where idx may be an integer value between one and the number of GPUs 210 in hardware UE 200. Not all GPUs 210 in hardware UE 200 may have sufficient computing capability to be utilized. If such a GPU 210 is selected (e.g., via query 1450), a warning may issue on selection and an error may issue when any attempt is made to use such a GPU 210. Alternatively, query 1450 may include the following syntax (e.g., using the convenience API):

newlySelectedDev=gpuDevice(idx).

TCE 320 may utilize a query 1460 (e.g., getDevice) to access a GPU 210 that is not currently selected. This may permit users to query properties of other GPUs 210 in hardware UE 200 without selecting them. TCE 320 may provide query 1460 to hardware UE 200, and hardware UE 200 may provide TCE 320 with access to properties of unselected GPUs 210. In one example, query 1460 may include the following syntax:

unselectedDev=parallel.gpu.GPUDevice.getDevice(idx), where idx may be a valid index as defined above. If idx is outside the valid range, an error may issue.

Although now shown in FIG. 14, a reset method can be invoked (e.g., by TCE 320) on an instance of GPUDevice. The reset method may cause a GPU 210 to be returned to a same state as at the start of a TCE 320 session (i.e., all GPU array and kernel objects may become invalid). This method may permit users to attempt to continue after encountering problems. The syntax for the reset method may include gpuDev.reset( ).

As further shown in FIG. 14, TCE 320 may provide a GPUDevice object 1470 to hardware UE 200, and, in return, hardware UE 200 may provide GPU device information 1480 to TCE 320. GPU device information 1480 may include a number of read-only properties about GPUs 210 provided on hardware UE 200. For example, GPU device information 1480 may include one or more of the properties summarized in Table 1 (below).

TABLE 1

| Property Name | TCE Data Type | Typical Value | Meaning |
| --- | --- | --- | --- |
| Name | char | 'Tesla C1060' | The name of the GPU |
| Index | double (integer value) | 1 | The index of the GPU, this may be the index that was used to select or access the GPU |
| ComputeCapability | char | '1.3' | The CUDA compute capability - this indicates the computational features available |
| DriverVersion | double | 3 | The CUDA device driver version being used |
| MaxThreadsPerBlock | double | 512 | The maximum supported thread block size for CUDAKernel execution |
| MaxShmemPerBlock | double | 16384 | The maximum amount of CUDA shared memory that can be used by a single thread block |
| MaxThreadBlockSize | double [1 × 3] | [512 512 64] | The maximum value in each dimension of the thread block |
| MaxGridSize | double [1 × 2] | [65536 65536] | The maximum value in each dimension of the grid of thread blocks |
| SIMDWidth | double | 32 | The number of threads executing simultaneously in SIMD mode on the GPU |
| TotalMemory | double | 4.2948e+09 | The total amount of GPU memory available in bytes |
| FreeMemory | double | 4.0843e+09 | Amount of free GPU memory in bytes |
| MultiprocessorCount | double | 30 | The number of vector processors present in the GPU |
| GPUOverlapsTransfer | logical | true | Whether the GPU supports overlapped data transfers |
| KernelExecutionTimeout | logical | false | Whether the GPU may abort long running kernel execution |
| DeviceSupported | logical | true | Whether the GPU is supported for use by the TCE |

Although FIG. 14 shows example information that may be exchanged between TCE 320 and GPUs 210, in other implementations, TCE 320 and GPUs 210 may exchange less information, different information, or more information than depicted in FIG. 14.

Example Process

FIGS. 15-19 are flow charts of an example process 1500 for transforming a GPU array construct into a GPU-executable form according to implementations described herein. In one implementation, process 1500 may be performed by client 500. In other implementations, process 1500 may be performed by another device or combination of devices (e.g., client 500 in conjunction with web service 580).

As shown in FIG. 15, process 1500 may include initiating a technical computing environment (TCE) (block 1510), and receiving, via the TCE, a program command to be executed by a GPU, where the program command enables a GPU array to be executed locally or remotely, and enables a distributed array or a distributed CPU array to be executed (block 1520). For example, in implementations described above in connection with FIGS. 7A and 7B, client 500 may initiate TCE 320, and may receive, vie TCE 320, a program command (e.g., GPU array command 720) that permits TCE 320 to access GPU 210. The program command may permit a GPU array to be locally executed (e.g., by client 500), a GPU array to be remotely executed (e.g., by GPU 210), a distributed array to be executed (e.g., by client 500), or a distributed CPU array to be executed (e.g., by CPU 220).

As further shown in FIG. 15, process 1500 may include transforming, via the TCE, the program command into a program command executable by the GPU (block 1530), providing the transformed program command to the GPU for execution (block 1540), and receiving result(s) associated with execution of the transformed program command (block 1550). For example, in implementations described above in connection with FIGS. 7A and 7B, client 500 may transform, via TCE 320, the program command into a program command that is executable by GPU 210, and may provide the transformed program command to GPU 210 for execution (e.g., as indicated by reference number 750). Client 500 may receive, from GPU 210, results associated with execution of the transformed program command by GPU 210, and may utilize the results via TCE 320.

Figure 16:
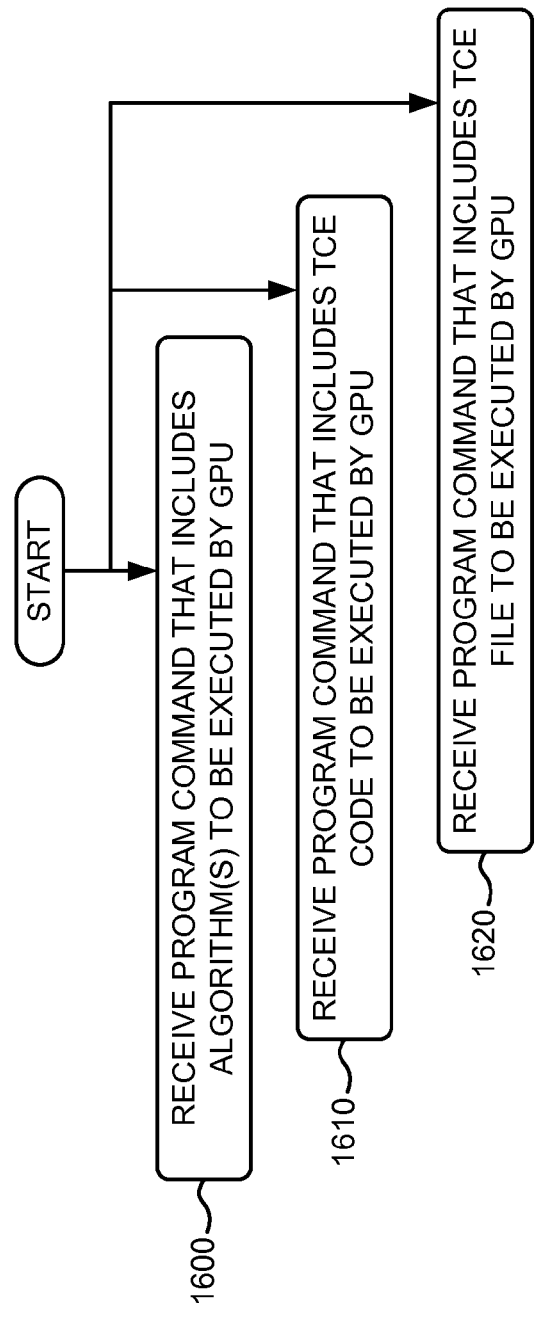

Process block 1520 may include the process blocks depicted in FIG. 16. As shown in FIG. 16, process block 1520 may include receiving a program command that include algorithm(s) to be executed by the GPU (block 1600), receiving a program command that includes TCE code to be executed by the GPU (block 1610), and/or receiving a program command that includes a TCE file to be executed by the GPU (block 1620). For example, in implementations described above in connection with FIGS. 7A and 7B, GPU array command 720 may provide a mechanism for executing algorithms (e.g., basic arithmetic, FFT and related algorithms, higher level algorithms, etc.) on one or more GPUs 210. In one example, TCE 320 may permit a user to input such algorithms via a command line or script. GPU array command 720 may provide a mechanism for executing user-written TCE 320 program code (or a program file), or a subset of TCE 320 programming language, on one or more GPUs 210.

Figure 17:
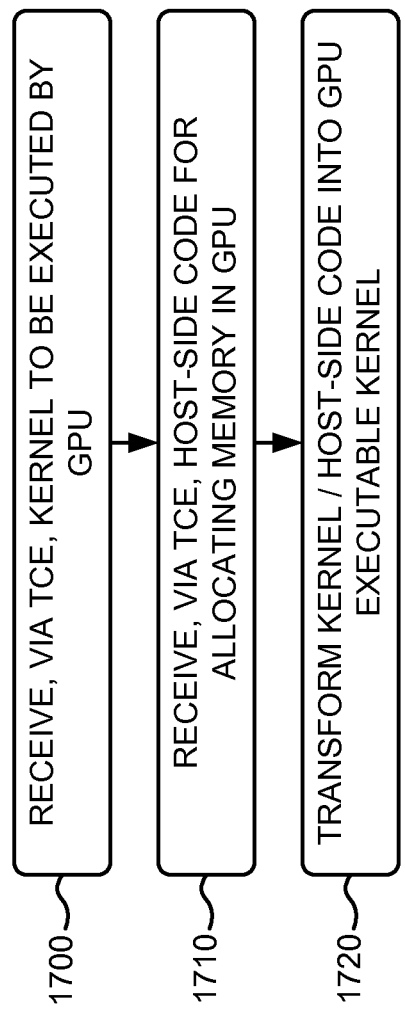

Process blocks 1520/1530 may include the process blocks depicted in FIG. 17. As shown in FIG. 17, process blocks 1520/1530 may include receiving, via the TCE, a kernel to be executed by the GPU (block 1700), receiving, via the TCE, host-side code for allocating memory in the GPU (block 1710), and transforming the kernel and host-side code into a GPU-executable kernel (block 1720). For example, in implementations described above in connection with FIG. 10, when users supply compiled kernel 1030 to TCE 320, information about types and sizes of input arguments (e.g., out and in) to the kernel code may be lost. To use compiled kernel 1030 in a CUDA setting, the user may write host-side code 1040, and may provide host-side code 1040 to TCE 320. Host-side code 1040 may provide instructions for allocating memory on GPU 210 for out and in arguments, instructions to enable TCE 320 to perform size and type conversions and checking, and instructions for invoking compiled kernel 1030 in such a way as to have one thread per element of out arguments. TCE 320 may receive compiled kernel 1030 and host-side code 1040, and may produce a GPU-executable kernel 1050 based on compiled kernel 1030 and host-side code 1040.

Figure 18:
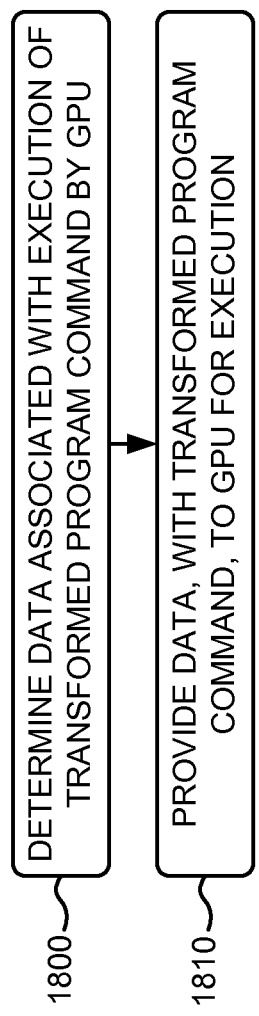

Process block 1540 may include the process blocks depicted in FIG. 18. As shown in FIG. 18, process block 1540 may include determining data associated with execution of the transformed program command by the GPU (block 1800), and providing data, with the transformed program command, to the GPU for execution (block 1810). For example, in implementations described above in connection with FIGS. 7A and 7B, GPU array command 720 may enable TCE 320 to determine data associated with execution of a program command by GPU(s) 210, and to send data (e.g., real and complex integer and floating point data types, real logical data types, etc.) to GPU(s) 210 so that GPU(s) 210 may perform operations with the data. This may prevent data from being transferred back and forth between TCE 320 and GPU(s) 210.

Figure 19:
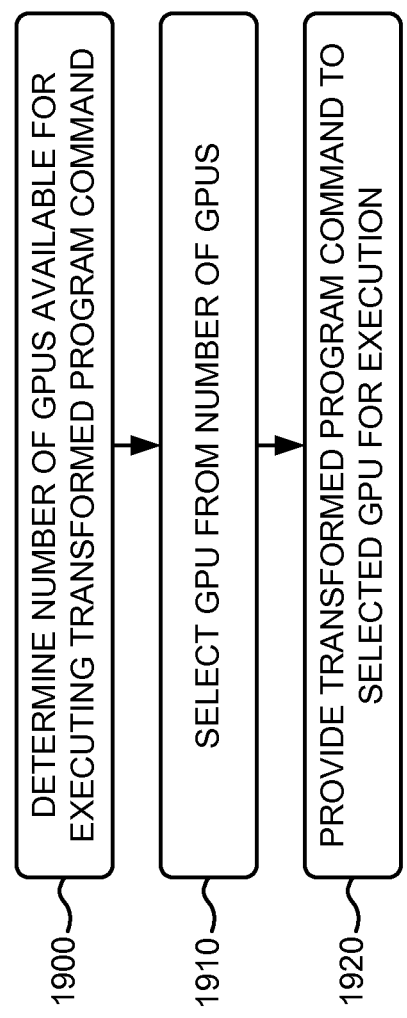

Alternatively, or additionally, process block 1540 may include the process blocks depicted in FIG. 19. As shown in FIG. 19, process block 1540 may include determining a number of GPUs available for executing the transformed program command (block 1900), selecting a GPU from the number of GPUs (block 1910), and providing the transformed program command to the selected GPU for execution (block 1920). For example, in implementations described above in connection with FIG. 14, before selecting a GPU 210, it may be necessary to know how many GPUs 210 are available to TCE 320. TCE 320 may provide query 1410 (e.g., requesting a number of GPUs 210 on hardware UE 200) to hardware UE 200. In response to query 1410, hardware UE 200 may return an indication 1420 of a number of GPUs 210 on hardware UE 200 (e.g., there may be four GPUs 210). TCE 320 may wish to select a different GPU 210 than a currently selected GPU 210. TCE 320 may select a different GPU 210 by providing query 1450 (e.g., requesting selection of a different GPU 210) to hardware UE 200. In response to query 1450, hardware UE 200 may provide TCE 320 with access to a different GPU 210. In one example, TCE 320 may provide program code to the selected GPU 210 for execution.

CONCLUSION

Systems and/or methods described herein may transform a GPU array construct into a form that is executable on a GPU. For example, in one implementation, the systems and/or methods may initiate a TCE, and may receive, via the TCE, a program command that permits the TCE to access a GPU, where the program command permits one or more of: a GPU array to be locally executed, a GPU array to be remotely executed, a distributed array to be executed, or a distributed CPU array to be executed. The systems and/or methods may transform, via the TCE, the program command into a program command that is executable by the GPU, and may provide the transformed program command to the GPU for execution. The systems and/or methods may receive, from the GPU, one or more results associated with execution of the transformed program command by the GPU, and may utilize the one or more results via the TCE.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 15-19, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" that performs one or more functions. This component may include hardware, such as a processor, an application-specific integrated circuit (ASIC), or a field-programmable gate array (FPGA), or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a computing device, the method comprising:
    initiating, via the computing device, a technical computing environment;
    receiving, by the computing device and via the technical computing environment, a program command to be executed by a graphical processing unit (GPU) that is remote to the computing device,
    the program command permitting the technical computing environment to transfer data to the remote graphical processing unit;
    transforming, by the computing device and via the technical computing environment, the program command into a program command that is executable by the remote graphical processing unit;
    determining, by the computing device, data associated with execution of the transformed program command by the remote graphical processing unit;
    providing, by the computing device, the data and the transformed program command to the remote graphical processing unit for execution,
    the remote graphical processing unit being to provide the data to another remote graphical processing unit; and
    receiving, by the computing device and from the remote graphical processing unit, one or more results associated with execution of the transformed program command by the remote graphical processing unit.

2. The method of claim 1, where the program command includes one or more of:
    one or more algorithms to be executed by the remote graphical processing unit;
    technical computing environment code to be executed by the remote graphical processing unit; or
    a technical computing environment file to be executed by the remote graphical processing unit.

3. The method of claim 1, where the program command enables at least one of:

data parallel processing,
task parallel processing, or
stream parallel processing.

4. The method of claim 1, further comprising:
creating, via the technical computing environment and based on the program command, a kernel to be executed by the remote graphical processing unit;
receiving, via the technical computing environment, host-side code for allocating memory of the remote graphical processing unit;
transforming the kernel and the host-side code into another kernel executable by the remote graphical processing unit; and
providing the other kernel to the remote graphical processing unit for execution.

5. The method of claim 1, where providing the transformed program command includes:
determining a number of remote graphical processing units available for executing the transformed program command;
selecting a remote graphical processing unit from the number of remote graphical processing units; and
providing the transformed program command to the selected remote graphical processing unit for execution.

6. The method of claim 1, where the program command is created using the technical computing environment.

7. The method of claim 1, where the remote graphical processing unit is provided in a device other than the computing device.

8. A non-transitory computer-readable media storing instructions, the instructions comprising:
one or more instructions which, when executed by at least one processor, cause the at least one processor to:
provide a technical computing environment;
receive, via the technical computing environment, a program command to be executed by a graphical processing unit (GPU) that is remote to a device containing the media,
the program command permitting the technical computing environment to transfer data to the remote graphical processing unit;
transform, via the technical computing environment, the program command into a program command that is executable by the remote graphical processing unit;
determine data associated with execution of the transformed program command by the remote graphical processing unit;
provide the data and the transformed program command to the remote graphical processing unit for execution; and
receive, from the remote graphical processing unit, one or more results associated with execution of the transformed program command by the remote graphical processing unit.

9. The non-transitory computer-readable media of claim 8, further comprising:
one or more instructions to create, based on the program command, a kernel to be executed by the remote graphical processing unit;
one or more instructions to transform the kernel into another kernel executable by the remote graphical processing unit; and
one or more instructions to provide the other kernel to the remote graphical processing unit for execution.

10. The non-transitory computer-readable media of claim 8, further comprising:
one or more instructions to receive, via the technical computing environment, a kernel to be executed by the remote graphical processing unit;
one or more instructions to receive, via the technical computing environment, host-side code for allocating memory of the remote graphical processing unit;
one or more instructions to transform the kernel and the host-side code into another kernel executable by the remote graphical processing unit; and
one or more instructions to provide the other kernel to the remote graphical processing unit for execution.

11. The non-transitory computer-readable media of claim 8, further comprising:
one or more instructions to determine a number of remote graphical processing units available for executing the transformed program command;
one or more instructions to select a remote graphical processing unit from the number of remote graphical processing units; and
one or more instructions to provide the transformed program command to the selected remote graphical processing unit for execution.

12. The non-transitory computer-readable media of claim 8, where the program command includes a gpuArray command.

13. A device comprising:
a memory to store a plurality of instructions; and
a processor to execute the plurality of instructions in the memory to:
initiate a technical computing environment,
receive, via the technical computing environment, a program command that permits the technical computing environment to access a graphical processing unit (GPU) that is remote to the device,
the program command permitting the technical computing environment to transfer data to the remote graphical processing unit,
transform, via the technical computing environment, the program command into a program command that is executable by the remote graphical processing unit,
determine data associated with execution of the transformed program command by the remote graphical processing unit,
provide the data and the transformed program command to the remote graphical processing unit for execution,
receive, from the remote graphical processing unit, one or more results associated with execution of the transformed program command by the remote graphical processing unit, and
utilize the one or more results via the technical computing environment.

14. The device of claim 13, where the program command further includes:
one or more algorithms to be executed by the remote graphical processing unit.

15. The device of claim 13, where the program command further includes:
technical computing environment code to be executed by the remote graphical processing unit.

16. The device of claim 13, where the program command further includes:
a technical computing environment file to be executed by the remote graphical processing unit.

17. The device of claim 13, where the processor is further to execute instructions in the memory to:
create, via the technical computing environment and based on the program command, a kernel to be executed by the remote graphical processing unit, receive, via the technical computing environment, host-side code for allocating memory of the remote graphical processing unit, transform the kernel and the host-side code into another kernel executable by the remote graphical processing unit, and provide the other kernel to the remote graphical processing unit for execution.

18. The device of claim 13, where the processor is further to execute instructions in the memory to:

determine a number of remote graphical processing units available for executing the transformed program command, select a remote graphical processing unit from the number of remote graphical processing units, and provide the transformed program command to the selected remote graphical processing unit for execution.

19. The device of claim 13, where the remote graphical processing unit is provided in another device separate from the device.

20. The device of claim 13, where the program command includes a gpuArray command.

\* \* \* \* \*